US012635688B2

(12) United States Patent
Bernardi et al.

(10) Patent No.: US 12,635,688 B2
(45) Date of Patent: May 26, 2026

(54) PROCESS AND SOLUTION FOR PREPARING A SURFACE WITH BACTERIOSTATIC AND BACTERICIDAL ACTIVITY, SURFACE THUS PREPARED AND USES THEREOF

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE (CNRS), Paris (FR); CONSERVATOIRE NATIONAL DES ARTS ET METIERS, Paris (FR); INSTITUT NATIONAL DES SCIENCES ET INDUSTRIES DU VIVANT ET DE L'ENVIRONNEMENT, Paris (FR); INSTITUT NATIONAL DE RECHERCHE POUR L'AGRICULTURE L'ALIMENTATION ET L'ENVIRONNMENT, Paris (FR)

(72) Inventors: Sarah Bernardi, Gif-sur-Yvette (FR); Géraldine Carrot, Gif-sur-Yvette (FR); Fanny Hauquier, Gif-sur-Yvette (FR); Morgan Guilbaud, Gif-sur-Yvette (FR)

(73) Assignees: COMMISSARIAT A L'ENERGIE ATOMIQUE ET AUX ENERGIES ALTERNATIVES, Paris (FR); CONSERVATOIRE NATIONAL DE LA RECHERCHE SCIENTIFIQUE (CNRS), Paris (FR); CONSERVATOIRE NATIONAL DES ARTS ET METIERS, Paris (FR); INSTITUT NATIONAL DES SCIENCES ET INDUSTRIES DU VIVANT ET DE L'ENVIRONNEMENT, Paris (FR); INSTITUT NATIONAL DE RECHERCHE POUR L'AGRICULTURE L'ALIMENTATION ET L'AGRICULTURE L'ALIMENTATION ET L'ENVIRONNEMENT, Paris (FR)

( * ) Notice: Subject to any disclaimer, the term of this patent is extended or adjusted under 35 U.S.C. 154(b) by 587 days.

(21) Appl. No.: 17/999,259

(22) PCT Filed: May 19, 2021

(86) PCT No.: PCT/FR2021/050887
§ 371 (c)(1),
(2) Date: Nov. 18, 2022

(87) PCT Pub. No.: WO2021/234290
PCT Pub. Date: Nov. 25, 2021

(65) Prior Publication Data

US 2023/0180744 A1 Jun. 15, 2023

(30) Foreign Application Priority Data

May 20, 2020 (FR) ....................................... 2005148

(51) Int. Cl.
*A01N 25/10* (2006.01)
*C09D 5/14* (2006.01)
(Continued)

(52) U.S. Cl.
CPC ............... *A01N 25/10* (2013.01); *C09D 5/14* (2013.01); *C09D 11/30* (2013.01); *C09D 133/14* (2013.01)

(58) Field of Classification Search
CPC .......... A01N 25/10; A01N 33/12; C09D 5/14; C09D 11/30; C09D 133/14; C09D 4/06;
(Continued)

(56) References Cited

U.S. PATENT DOCUMENTS 3,784,649 A 1/1974 Buckman et al.
4,840,851 A 6/1989 Gölander
(Continued)

FOREIGN PATENT DOCUMENTS

CN 101818005 A 9/2010
EP 0229066 A1 7/1987
(Continued)

OTHER PUBLICATIONS

International Search Report for PCT/FR2021/050887 dated Nov. 3, 2021.
(Continued)

*Primary Examiner* — Prem C Singh
*Assistant Examiner* — Francis C Campanell
(74) *Attorney, Agent, or Firm* — Chrisman Gallo Tochtrop LLC

(57) ABSTRACT

A method for conferring bacteriostatic or bactericidal properties on a surface of an object, comprising: (a) putting the
(Continued)

surface into contact with an aqueous solution comprising an ionene-type polymer functionalised by at least one radically polymerisable function, an organic compound with two radically polymerisable functions, an organic compound with three radically polymerisable functions and a photoinitiator, (b) subjecting the surface coated with the aqueous solution to irradiation by means of which a radical polymerisation is initiated and a grafted three-dimensional polymer network comprising ionene-type polymers is obtained. The aqueous solution and the object thus obtained as well as uses thereof in particular for preparing protective garments, for packaging and/or storing fresh food products but also for purifying or decontaminating a solution or a surface.

17 Claims, 5 Drawing Sheets

(51) Int. Cl.
*C09D 11/30* (2014.01)
*C09D 133/14* (2006.01)

(58) Field of Classification Search
CPC ...... C09D 7/65; C09D 11/101; C09D 179/02; C08F 2/48; C08F 2/50; C08F 290/065; C08G 73/0226
USPC .......................................................... 585/415
See application file for complete search history.

(56) References Cited

U.S. PATENT DOCUMENTS

| | | | | |
|---|---|---|---|---|
| 4,980,067 | A | 12/1990 | Hou et al. | |
| 2003/0031644 | A1* | 2/2003 | Fitzpatrick | A61K 31/80 528/423 |
| 2003/0152623 | A1* | 8/2003 | Bromberg | A61K 8/90 424/468 |
| 2012/0186446 | A1* | 7/2012 | Bara | C08G 73/0616 96/5 |
| 2019/0153248 | A1* | 5/2019 | Martinez de Leon | B41M 5/03 |

FOREIGN PATENT DOCUMENTS

| | | | |
|---|---|---|---|
| FR | 3090271 | A1 | 6/2020 |
| WO | 2008049108 | A1 | 4/2008 |
| WO | 2008078052 | A1 | 7/2008 |

OTHER PUBLICATIONS

Written Opinion for PCT/FR2021/050887 dated Nov. 3, 2021.
Dhende, Vikram et al, "One-Step Photochemical Synthesis of Permanent, Nonleaching, Ultrathin Antimicrobial Coatings for Textiles and Plastics" ACS Applied Materials & Interfaces, 2011, 3, pp. 2830-2837.
Dehnavi, Arefeh Sadat et al, "Preparation and Characterization of Polyethylene/Silver Nanocomposite Films with Antibacterial Activity" Journal of Applied Polymer Science, 2013, vol. 127, pp. 1180-1190.
Carvalho, P. et al, "Influence of thickness and coatings morphology in the antimicrobial performance of zinc oxide coatings" Applied Surface Science 2014, vol. 307, pp. 548-557.
Palza, Humberto, Antimicrobial Polymers with Metal Nanoparticles: International Journal of Molecular Sciences, 2015, vol. 16, pp. 2099-2116.
Arroyo, J.M. et al. Effect of the presence of titania nanoparticles in the development of Pseudomonas fluorescens biofilms on LDPE, RSC Adv. 2014, vol. 4, pp. 51451-51458.
Lewinski, Nastassja et al, "Cytotoxicity of Nanoparticles" Small 2008, vol. 4, No. 1, pp. 26-49.
Guerra, Nelson P. et al, "Antimicrobial Activity of Nisin Adsorbed to Surfaces Commonly Used in the Food Industry. Food" Journal of Food Protection. 2005, vol. 68, No. 5, 1012-1019.
Del Nobile, M.A. et al, "Active packaging by extrusion processing of recyclable and biodegradable polymers" Journal of Food Engineering 2009, vol. 93, 1-6.
Nostro, A. et al, "Study on carvacrol and cinnamaldehyde polymeric films: mechanical properties, release kinetics and antibacterial and antibiofilm activities" Journal of Applied Microbial Biotechnol 2012, vol. 96, pp. 1029-1038.
Min, Jouha et al, "Tunable Staged Release of Therapeutics from Layer-by-Layer Coatings with Clay Interlayer Barrier", Biomaterials, Mar. 2014, vol. 35, pp. 2507-2517.
Li, Peng et al, "Antimicrobial macromolecules: Synthesis methods and future applications" RSC Advances, May 2012, vol. 2, pp. 4031-4044.
Kurt, Pinar et al, "Highly Effective Contact Antimicrobial Surfaces via Polymer Surface Modifiers", Langmuir 2007, vol. 23, pp. 4719-4723.
Strassburg, Arne et al, "Nontoxic, Hydrophilic Cationic Polymers—Identified as Class of Antimicrobial Polymers" Macromolecular Bioscience, 2015, vol. 15, pp. 1710-1723.
Lou, Weiyang et al., "Antimicrobial polymers as therapeutics for treatment of multidrugresistant Klebsiella pneumoniae lung infection", Acta Biomaterialia 2018, vol. 78, 78-88.
Mattheis, Claudia et al, "Closing One of the Last Gaps in Polyionene Compositions: Alkyloxyethylammonium Ionenes as Fast-Acting Biocides", Macromolecular Bioscience 2012, vol. 12, pp. 341-349.
Liu, Shaoqiong et al, "Highly potent antimicrobial polyionenes with rapid killing kinetics, skin biocompatibility and in vivo bactericidal activity" Biomaterials 2017, vol. 127, pp. 36-48.

* cited by examiner

PROCESS AND SOLUTION FOR PREPARING A SURFACE WITH BACTERIOSTATIC AND BACTERICIDAL ACTIVITY, SURFACE THUS PREPARED AND USES THEREOF

CROSS-REFERENCE TO RELATED APPLICATIONS

This is a National Stage application of PCT international application PCT/FR2021/050887, filed on May 19, 2021, which claims the priority of French Patent Application No. FR 2005148, filed May 20, 2020, both of which are incorporated herein by reference in their entirety.

TECHNICAL FIELD

The present invention relates to the technical field of antibacterial surfaces and, more particularly, surfaces on which polymers with a bacteriostatic or bactericidal activity of the polyionene type are covalently grafted.

More particularly, the present invention relates to a method and a solution for conferring bacteriostatic or bactericidal properties on the surface of an object, consisting of depositing, on this surface, polymers with bacteriostatic or bactericidal activity of the polyionene type, in particular in the form of an ink, these then being crosslinked via irradiation and in particular photonic annealing so as to create covalent bonds between the surface and the polymers. The present invention also relates to the surface having bacteriostatic or bactericidal properties thus prepared and uses thereof.

PRIOR ART

For both economic and environmental concerns, there has been an increasing demand, during the past years, for antibacterial surfaces or coatings that allow a durable decontamination action in the field of packages of food products such as fresh food products, of the environment or of the hospital environment.

Former generations of antimicrobial coatings with chemical elution have only a short-term antimicrobial effect and cause toxicity and/or microbial resistance. The widespread use of solutions is also expensive and has a significant negative impact on the environment (effluents). An active coating by contact containing immobilised antimicrobial agents is less liable to cause the development of a resistance to bacteria. This is because this class of coating interferes with the membranes of the bacteria without targeting their metabolic activity, which is associated with the appearance of resistance. Antimicrobial polymers, in particular cationic ones, have been applied as proadhesive coatings and have been reported to effectively interfere with the cytoplasmic membrane of undesirable bacteria (alteration and pathogenic flora) [1]. However, many questions remain with regard to the influence of the structure and the architecture of the polymer film on its antibacterial properties.

With regard to nosocomial infections, everyday problems, packaging of fresh products and purification of water, there is a need for stable, robust and effective antibacterial coatings. Inorganic nanoparticles, and in particular silver nanoparticles [2], are often selected for reinforcing the antibacterial effect of polymer films in terms of activity and stability. The main problem is the release of these nanoparticles, in particular toxic silver nanoparticles, or corresponding ions in the surrounding environment. It should be noted that, generally, the use of silver nanoparticles has been limited because of the toxicity risk. Other examples of inorganic composites comprise the use of less toxic nanoparticles, such as ZnO [3], copper [4] or $TiO_2$ [5]. However, the marketing of plastic films containing inorganic nanoparticles [6] for applications in the food field for example has encountered a great deal of reticence on the part of producers.

Another method also explored in particular in the field of packaging consists of the adsorption or grafting of small molecules such as triclosan, nisin [7] or essential oils such as thymol [8] or carvacrol [9]. The problem lies in the release of these molecules from the packaging, because of the simple physical adsorption thereof on the film and/or the low thermal stability of the molecules at the high temperatures of the packaging process or other industrial methods such as the extrusion of plastic films. The packages thus treated lose efficacy over time. In addition, the release of the molecules is a serious problem related to potentially toxic molecules such as triclosan, known as an endocrine disruptor, but also in the case of "safer" molecules such as essential oils. This is because the diffusion thereof in the food or the environment (water) is liable to cause a modification of the taste. An alternative method is to immobilise the antimicrobial agent on clay of the montmorillonite type [10], in order to control the diffusion thereof and to increase the thermal stability thereof.

The prior art also knows coatings on which antimicrobial agents are immobilised. Cationic antimicrobial peptides (or AMP, standing for "AntiMicrobial Peptides") have proved to be particularly effective because of their particular antimicrobial activity based on nonspecific, electrostatic and hydrophobic, interactions [11].

As already mentioned, antimicrobial polymers are particularly advantageous since they also generally have a long-term activity with in addition high chemical stability (reduction of residual toxicity and of microbial resistance). Among these, polycations based on quaternary ammonium salts and with an adjustable amphiphilic character have been described as capable of effectively disrupting the external cytoplastic membrane of cells causing lysis and therefore cell death. It has been shown that one of the key parameters for an effective antibacterial effect of the polymer is its amphiphilic character, namely the hydrophobic/charge ratio. When these polymers are used as coatings that are active by contact (bacteriostatic), it has been shown clearly that (i) the presence of sufficiently long hydrophobic chains is necessary to penetrate and burst the bacterial membrane, and (ii) high levels of positive charges are necessary for conferring antimicrobial properties, independently of the length of the hydrophobic chains [1].

In this context, polyionenes or ionenes containing quaternary ammoniums, in the main chain of the polymer or skeleton, separated by hydrophobic fragments, are particularly interesting candidates [12-16]. This is because Strassburg et al have demonstrated that polyionenes have particularly effective antimicrobial properties, mainly because of the presence of alkyl groups of variable length [13]. It was also shown that these polymers had low cytotoxicity [14] and the Argawal group also introduced ethoxyethyl and aliphatic segments in the ionene structure to evaluate the influence of these segments with regard to the biocidal activity and to reinforce the biocompatibility of these polymers [15]. More recently, a complete study on the activity of ionenes was carried out by the groups of Hedrick and Yang on clinically isolated multiresistant microorganisms (MDR)

[16]. This study showed that these microorganisms, although resistant to many antibiotics, were sensitive to polyionenes.

The U.S. Pat. No. 4,980,067 proposes coating or grafting microporous membranes with polyionenes, to eliminate contaminants of the microorganism type possibly present in biological liquids [17]. More particularly, this patent describes the incorporation of polyionenes in microporous membranes consisting of nylon and potentially positively charged. This incorporation is done via a method using a bonding agent of the epoxy type present either in the form of an additive or in the form of reactive functions in the polymer. The latter strategy is limiting with regard to the selection of the polyionene to be incorporated. Moreover, there is no characterisation of the grafting reactions implemented making it possible to state that the polyionene is not simply adsorbed or even salted out in solution. This is because the only tests that are implemented in the experimental part of [17] are tests on the inhibition of the growth of the bacteria and the method used, namely the measurement of the optical density, is particularly adapted to solutions and not to surfaces.

The inventors have set themselves the aim of proposing a simple, robust and industrializable method, making it possible to obtain a novel active coating able to control, limit or inhibit the bacterial growth of undesirable flora (alteration and pathogenic) for applications both in the food field and in the health, medical, military or environmental field.

The inventors have also set themselves the aim of proposing a simple robust method that is capable of industrial application, making it possible to obtain a novel active coating, bonded covalently to the surface on which it has been deposited and not having the drawbacks of the coatings of the prior art, in particular in terms of release of compounds.

DISCLOSURE OF THE INVENTION

The present invention makes it possible to achieve the aim that the inventors have set themselves and therefore relates to a method for preparing an adhesive coating with bacteriostatic or bactericidal properties aimed at obtaining a bacteria trap.

The coating prepared by the method according to the invention is based on the use of a particular solution making it possible to obtain a polymer film of the crosslinked solid type, bacteriostatic or bactericidal, wherein the majority of undesirable bacteria are trapped to limit their growth in order to avoid multiplication thereof on the product or in the environment. In addition, to avoid any release phenomenon, the method according to the invention involves a film grafted covalently to the initial substrate. To do this, the inventors have developed a photo-crosslinkable solution comprising polyionenes, which, once subjected to UV irradiation and in particular to photonic annealing, produces a polymeric three-dimensional network in which the polyionenes are covalently incorporated.

Moreover, the inventors have shown that the use of active polymers leads to several advantages: i) a greater quantity of biocidal groups, ii) a greater mobility, which is an important parameter for interactions with the bacterial membrane, iii) better stability with respect to the temperatures for example used in the methods of processing packaging films. The more particular use of ionene-type polymers offers not only the advantage of having a bacteriostatic or bactericidal property that is both proadhesive (the bacteria are trapped), and adjustable with regard to bactericidal capability. This is because, according to the monomers (dihalogens and diamines) used for preparing these polymers, it is possible to inhibit, in whole or in part, the strains present. Indeed, in the method according to the present invention, there is no limitation with regard to the polymers of the ionene type that can be used, the radically polymerisable function or functions that they must have being able to be provided via a post-functionalisation.

In addition, the particular solution used in the invention may be in the form of an ink, which makes it possible to print the proadhesive and bacteriostatic/bactericidal coating, on large surfaces and in a manner that is reproducible, rapid and industrializable.

In the field of food packages, the coating according to the invention, both proadhesive and bacteriostatic/bactericidal, makes it possible to trap the undesirable flora (alteration and pathogenic) irreversibly and has a particularly advantageous impact both economically and environmentally. This is because it is particularly useful for better storage of fresh products, a reduction in the use-by date (UBD) and a reduction in food waste in the packaging field.

Beyond the application in the food field, the present invention can also very usefully apply in the health, medical, hospital, military or environmental field in the broad sense, for the purpose of manufacturing garments or protective coatings and decontamination or purification objects such as rod, probe, paper, textile and membrane and/or "container" surfaces such as tray, case and packaging film that can advantageously serve as "bacteria traps". The low cytotoxicity of polyionenes and their ability to limit the resistance of bacteria are additional assets for this type of application.

More particularly, the present invention relates to a method for conferring bacteriostatic or bactericidal properties on the surface of an object consisting of:

(a) putting said surface into contact with an aqueous solution comprising:
  - at least one ionene-type polymer functionalised by at least one radically polymerisable function,
  - at least one organic compound with two radically polymerisable functions,
  - at least one organic compound with three radically polymerisable functions, and
  - a photoinitiator, (b) subjecting said surface coated with said aqueous solution to an irradiation by means of which a radical polymerisation is initiated and a grafted three-dimensional polymer network comprising ionene-type polymers is obtained.

As previously mentioned, the present invention applies to any object that can serve not only in the packaging and storage of products but also as a protective, decontamination and/or purification device in the hospital field or the environment. This object can therefore be selected from the group consisting of a film such as, for example, a packaging film, a box, a tray, a case, a lid, a sachet, dialysis equipment, a rod, a probe, paper, a textile, a membrane and a filter.

The surface of the object may be an inorganic or organic surface. The material of this surface may be selected from the group consisting of glass; a polymer material or resin such as, by way of examples, polyethylene (PE), polycarbonate (PC), polystyrene (PS), polypropylene (PP), polyethylene terephthalate (PET), polymethylmethacrylate (PMMA), polyvinyl chloride (PVC), an epoxy resin, polyurethane, etc.; a metal material such as stainless steel, tin or aluminium; silicon; silica; clays; ceramics; natural fibres and synthetic fibres.

Prior to the implementation of the method, i.e. prior to step a) thereof, it is possible to subject the surface of the object to an oxidising treatment and/or to form an organic sublayer on said surface.

The last oxidising treatment aims to oxidise the surface of the object used by fixing and/or introducing thereon, groups, identical or different, rich in oxygen, i.e. groups, identical or different, comprising at least one oxygen atom. A group comprising at least one oxygen atom is in particular selected from the group formed by a carboxylic group (—C(═O)OH), a hydroxyl group (—OH), an alkoxyl group (—OX with X representing an alkyl group, an acyl group or an aryl group), a carbonyl group (—C(═O)—), a percarbonic group (—C(═O)—O—OH) and an amide group (—C(═O)$NH_2$).

Such an oxidising treatment is based on two major types of surface modification based on:

- physical treatments such as a plasma treatment, in particular oxygen, a UV treatment, an X-ray or gamma treatment, a treatment by electron and heavy-ion irradiation;
- chemical treatments such as a treatment with alcoholic potash, a treatment with a mixture of sulfuric acid ($H_2SO_4$) and hydrogen peroxide ($H_2O_2$), also known by the term "piranha mixture", a treatment with a strong acid (HCl, $H_2SO_4$, $HNO_3$, $HClO_4$), a treatment with soda, a treatment with a strong oxidant ($KMnO_4$, $K_2Cr_2O_7$, $KClO_3$ or $CrO_3$ in hydrochloric acid, sulfuric acid or nitric acid), a treatment with ozone and a heat treatment under oxygenated atmosphere ($O_2$, $H_2O$, etc.).

A person skilled in the art will be able to determine the treatment, physical and/or chemical, best adapted according to the chemical nature of the surface of the object.

An organic sublayer could also be made necessary for facilitating the grafting of the polymers during step b), in particular on inorganic substrates. By way of particular examples of organic sublayers that can be envisaged, mention can be made of a sublayer of polydopamine or of a polydopamine derivative, in particular on a surface based on oxides, as described in the international application WO 2008/049108 [18], or grafting, via diazonium salts, on metal surfaces, as described in the international application WO 2008/078052 [19] and in the prior art cited in this application.

The aqueous solution used at step a) of the method according to the invention comprises at least one ionene-type polymer functionalised by at least one radically polymerisable function.

"Ionene-type polymer" means, in the context of the present invention, a cationic polymer wherein all or some of the positive charges are provided by quaternary ammoniums present in the main chain of the polymer, said positive charges being separated by hydrophobic segments. Hereinafter and hereinabove, the expressions and terms "ionene-type polymer", "ionene", "polyionene" and "PI" are equivalent and can be used interchangeably.

Any ionene-type polymer capable of being obtained by reaction of a diamine and a dihalogen can be used in the context of the present invention, provided that it has at least one radically polymerisable function.

"Radically polymerisable function" means, in the context of the present invention, any organic chemical function capable of being involved in a radical polymerisation reaction, i.e. able to provide, after activation, at least one active radical species capable of reacting with another radically polymerisable function so as to form a single covalent bond, in particular of the carbon-carbon or carbon-oxygen type. Advantageously, a radically polymerisable function has at least one bond of the ethylenic type, i.e. a function of the ethylenic type or an ethylenic unsaturation function. Advantageously, a radically polymerisable function is selected from the group consisting of acrylate, methacrylate, styrene, vinyl, acrylamide and methacrylamide functions.

Advantageously, the diamine used for preparing the ionene-type polymer that can be used in the method according to the invention is of formula (I):

(R1)(R2)N-A-N(R3)(R4) (1)

wherein

- R1, R2, R3 and R4, identical or different, represent a hydrogen atom, an alkyl group, optionally substituted, or an aryl group, optionally substituted; and
- A is a chain selected from the group consisting of an alkylene chain, optionally substituted, an alkenylene or alkynylene chain, optionally substituted, an arylene chain, optionally substituted, an alkylarylene chain, optionally substituted, and an arylalkylene chain, optionally substituted.

"Alkyl group" means a linear, branched or cyclic alkyl group, comprising from 1 to 20 carbon atoms, in particular from 1 to 15 carbon atoms and, in particular, from 1 to 10 carbon atoms, said alkyl group optionally being able to comprise at least one heteroatom and/or at least one double or triple carbon-carbon bond.

"Heteroatom" means, in the context of the present invention, an atom selected from the group consisting of a nitrogen, an oxygen, a phosphorus, a sulfur, a silicon, a fluorine, a chlorine and a bromine.

"Substituted alkyl group" means, in the context of the present invention, an alkyl group as previously defined substituted by a group or a plurality of groups, identical or different, selected from the group consisting of a halogen; an amine; a diamine; a carboxyl; a carboxylate; an aldehyde; an ester; an ether; a ketone; a hydroxyl; an alkyl, optionally substituted; an amide; a sulfonyl; a sulfoxide; a sulfonic acid; a sulfonate; a nitrile, a nitro; an acyl; an epoxy; a phosphonate; an isocyanate; a thiol; a glycidoxy; an acryloxy and a radically polymerisable function "Halogen" means, in the context of the present invention, an atom selected from the group consisting of an iodine, a fluorine, a chlorine and a bromine.

By way of particular examples of alkyl groups that can be used for R1 to R4, mention can be made of the methyl, ethyl, n-propyl, isopropyl, butyl, isobutyl, sec-butyl, tert-butyl, pentyl, isopentyl, hexyl, heptyl, octyl and nonyl groups, these groups optionally being able to be substituted by at least one radically polymerisable function.

"Aryl group" means, in the context of the present invention, any group comprising an aromatic ring or a plurality of aromatic rings, identical or different, bonded or connected by a single bond or by a hydrocarbon chain, an aromatic ring having from 3 to 20 carbon atoms, in particular from 3 to 14 carbon atoms and especially from 3 to 8 carbon atoms, and optionally being able to comprise a heteroatom. By way of aryl group that can be used in the invention, mention can be made of a phenyl group.

"Substituted aryl group" means, in the context of the present invention, an aryl group as previously defined substituted by a group or a plurality of groups, identical or different, selected from the group consisting of a halogen; an amine; a diamine; a carboxyl; a carboxylate; an aldehyde; an ester; an ether; a ketone; a hydroxyl; an alkyl optionally substituted; an amide, a sulfonyl; a sulfoxide; a sulfonic acid; a sulfonate; a nitrile; a nitro; an acyl; an epoxy; a phosphonate; an isocyanate; a thiol; a glycidoxy; an acryloxy and a radically polymerisable function.

By way of particular examples of aryl groups that can be used for R1 to R4, mention can be made of the phenyl, biphenyl, naphthyl, anthracenyl, cyclopentadienyl, pyrenyl or naphthyl groups, these groups optionally being able to be substituted by at least one radically polymerisable function.

"Alkylene chain" means, in the context of the present invention, an alkylene chain, linear, branched or cyclic, comprising from 1 to 30 carbon atoms, in particular from 2 to 20 carbon atoms and especially from 3 to 15 carbon atoms, said alkylene chain optionally being able to comprise at least one heteroatom.

"Alkenylene or alkynylene chain" means, in the context of the present invention, an alkenylene or alkynylene chain, linear, branched or cyclic, comprising from 2 to 30 carbon atoms, in particular from 2 to 20 carbon atoms and, especially, from 2 to 15 carbon atoms, said alkenylene or alkynylene chain optionally being able to comprise at least one heteroatom.

"Arylene chain" means, in the context of the present invention, any chain comprising an aromatic ring or a plurality of aromatic rings, identical or different, bonded or connected by a single bond or by a hydrocarbon chain, an aromatic ring having from 3 to 20 carbon atoms, in particular from 3 to 14 carbon atoms and, especially, from 3 to 8 carbon atoms and optionally being able to comprise a heteroatom.

"Alkylarylene chain" means, in the context of the present invention, any chain derived from an arylene chain as previously defined wherein a hydrogen atom is replaced by an alkyl group as previously defined.

"Arylalkylene chain" means, in the context of the present invention, any chain derived from an alkylene chain as previously defined wherein a hydrogen atom is replaced by an aryl group as previously defined.

"Substituted alkylene chain", "substituted alkenylene or alkynylene chain", "substituted arylene chain", "substituted alkylarylene chain" and "substituted arylalkylene chain" means, in the context of the present invention, an alkylene chain, an alkenylene or alkynylene chain, an arylene chain, an alkylarylene chain and an arylalkylene chain as previously defined substituted by a group or a plurality of groups, identical or different, selected from the group consisting of a carboxyl; a carboxylate; an aldehyde; an ester; an ether; a ketone; a hydroxyl; an alkyl, optionally substituted; an amide; a sulfonyl; a sulfoxide; a sulfonic acid; a sulfonate; a nitrile; a nitro; an acyl; an epoxy; a phosphonate; an isocyanate; a thiol; a glycidoxy; an acryloxy and a radically polymerisable function.

By way of examples of alkylene chains that can be used in the invention, mention can be made of a methylene, ethylene, propylene, butylene, pentylene, hexylene, heptylene, octylene, decylene, undecylene, dodecylene chain and a chain of formula $-(CH_2)_n-O-(CH_2)_m-$ or $-(CH_2)_n-S-(CH_2)_m-$ with n and m, identical or different, representing 0 or an integer between 1 and 20 and with n+m greater than or equal to 1, said chains optionally being able to be substituted by at least one radically polymerisable function.

By way of more particular examples of alkylene chains that can be used in the invention, mention can be made of a propylene, butylene, pentylene, hexylene, heptylene, octylene, decylene, undecylene, dodecylene chain and a chain of formula $-(CH_2)_n-O-(CH_2)_m-$ or $-(CH_2)_n-S-(CH_2)_m-$ with n and m, identical or different, representing 0 or an integer between 1 and 20 and with n+m greater than or equal to 1, said chains optionally being able to be substituted by at least one radically polymerisable function.

By way of examples of arylene chains that can be used in the invention, mention can be made of a phenylene or biphenylene chain, said chain optionally being able to be substituted by at least one radically polymerisable function.

In a particular embodiment, the R1, R2, R3 and R4 radicals are identical. In a more particular embodiment, the R1, R2, R3 and R4 radicals are identical and represent a methyl or an ethyl, optionally substituted by at least one radically polymerisable function.

Advantageously, the dihalogen used for preparing the ionene-type polymer that can be used in the method according to the invention is of formula (II):

$$(R5)\text{-}B\text{—}(R6) \qquad \text{(II)}$$

wherein

R5 and R6, identical or different, represent a halogen; and

B is a chain selected from the group consisting of an alkylene chain, optionally substituted, an alkenylene or alkynylene chain, optionally substituted, an arylene chain, optionally substituted, an alkylarylene chain, optionally substituted, and an arylalkylene chain, optionally substituted.

In a particular embodiment, the R5 and R6 radicals are identical. In a more particular embodiment, the R5 and R6 radicals are identical and represent a bromine atom, a chlorine atom or an iodine atom. In a still more particular embodiment, the R5 and R6 radicals are identical and represent a bromine atom.

Thus the ionene-type polymer functionalised by at least one radically polymerisable function that can be used in the context of the present invention comprises, in its main chain, a concatenation of repetitive units, identical or different, each unit being selected from the unit of formula (III) and the unit of formula (IV):

$$\text{—}N^+(R1)(R2)\text{-}A\text{-}N^+(R3)(R4)\text{-}B\text{—} \qquad \text{(III)}$$

$$\text{—}N^+(R3)(R4)\text{-}A\text{-}N^+(R1)(R2)\text{-}B\text{—} \qquad \text{(IV)}$$

wherein R1, R2, R3, R4, A and B are as previously defined and said ionene-type polymer being functionalised by at least one radically polymerisable function.

Typically, in the ionene-type polymer used in the context of the present invention, at least one radically polymerised function as previously defined is bonded, covalently, to an atom of the main chain or skeleton, to an atom of a side chain or to an atom of a pendant group of the ionene-type polymer.

In a first variant, the ionene-type polymer used in the invention has, as soon as it is prepared from a diamine and a dihalide as previously defined, at least one radically polymerisable function. For example, the radically polymerisable function can substitute at least one group from the R1, R2, R3 and R4 radicals and the A and B chains as previously defined. Thus, in this first variant, the ionene-type polymer functionalised by at least one polymerisable function is prepared via a polyaddition, also known by the expression "Menschutkin reaction", involving at least one diamine of formula (I) as previously defined and at least one dihalide of formula (II) as previously defined. The R1, R2, R3 and R4 functions carried by the diamine or diamines and the R5 and R6 functions carried by the dihalide or dihalides are the reactive functions during this polyaddition reaction.

The latter is implemented at a temperature higher than ambient temperature. "Ambient temperature" means a temperature of 23° C.±5° C. Advantageously, the temperature during the polyaddition is greater than 30° C. Typically, the temperature during the polyaddition is between 40° C. and 80° C., in particular between 55° C. and 75° C. and more particularly is of the order of 65° C. (i.e. 65° C.±5° C.). Advantageously, during the polyaddition step, the diamine or diamines and the dihalide or dihalides are in solution in a polar, protic or aprotic solvent. This solvent is in particular N,N-dimethylformamide (DMF) or a hydroxyl solvent, in particular methanol, ethanol or one of the mixtures thereof, and more particularly methanol.

By routine work, a person skilled in the art will be able to determine, without any inventive effort, the quantity of diamine or diamines and of halide or halides to be used according in particular to their solubility in the solvent as well as the duration of the polyaddition. By way of example, this duration may be between 6 h and 30 h, in particular between 12 h and 24 h and especially be of the order of 17 h (i.e. 17 h±2 h).

This polyaddition is typically implemented under stirring and advantageously under inert atmosphere.

In a second variant, the ionene-type polymer obtained following the polyaddition step does not carry a radically polymerisable function as previously defined. This second variant also applies in the case where it is wished to increase the number of radically polymerisable functions carried by the ionene-type polymer already functionalised by at least one radically polymerisable function. The radically polymerised functions are added, after the polyaddition, by replacing a function or a plurality of functions, identical or different, substituting the ionene-type polymer by one or more radically polymerisable functions by means of one or more simple chemical reactions.

In this second variant, the polyaddition step as previously defined is followed by an operation during which a function or a plurality of functions, identical or different, substituting the ionene-type polymer is/are replaced by one or more radically polymerisable functions as previously defined. This operation therefore corresponds to a post-functionalisation of the ionene-type polymer by at least one radically polymerisable function. By way of examples of simple chemical reaction that can be used for this substitution/post-functionalisation, mention can be made of a radical substitution or a nucleophilic addition. Certain embodiments of this second variant may be implemented under inert atmosphere.

The experimental part provides below an example of such a post-functionalisation in two steps, the first consisting in increasing the halogenated chain ends on the ionene-type polymer and then the second in replacing at least one of these halogens with a radically polymerisable function. The ionene-type polymer thus has one or more radically polymerisable functions at its main chain end.

The aqueous solution used at step a) of the method according to the invention may comprise one or more different ionene-type polymers.

Advantageously, this or these ionene-type polymer(s) have a molar mass of between 1000 $g \cdot mol^{-1}$ and 20,000 $g \cdot mol^{-1}$, in particular between 1500 $g \cdot mol^{-1}$ and 10,000 $g \cdot mol^{-1}$, in particular between 2000 $g \cdot mol^{-1}$ and 5000 $g \cdot mol^{-1}$ and more particularly of the order of 3000 $g \cdot mol^{-1}$, i.e. 3000±500 $g \cdot mol^{-1}$.

Typically, the ionene-type polymer or polymers is/are present in the aqueous solution of step a) in a total quantity of between 1% and 10%, in particular between 2% and 7% and especially of the order of 4% (i.e. 4%±0.5%) by mass with respect to the total mass of the aqueous solution of step a).

In addition, the aqueous solution used at step a) of the method according to the invention comprises at least one organic compound with two radically polymerisable functions and at least one organic compound with three radically polymerisable functions.

This is because the work of the inventors has shown that the organic compound with two radically polymerisable functions and the organic compound with three radically polymerisable functions constitute the two essential elements for forming the three-dimensional polymer network during step b) of the method, i.e. during the crosslinking under photonic annealing. Without these two elements, the crosslinking of the ink does not occur. The presence of the ionene-type polymer functionalised by at least one radically polymerisable function and of the organic compound with three radically polymerisable functions alone is not sufficient to cause the crosslinking under photonic annealing.

Any organic compound with two radically polymerisable functions can be used in the context of the present invention. Typically, these compounds comprise a hydrocarbon group and two ethylenic unsaturation functions. Such compounds are well known and commercially accessible.

Advantageously, an organic compound with two radically polymerisable functions that is useful in the context of the present invention is selected from the group consisting of 1,3-butylene glycol diacrylate, 1,3-butylene glycol dimethacrylate, 2,2-dimethylolpropane diacrylate, 2,2-dimethylolpropane dimethacrylate, 2,2-di(p-hydroxyphenyl)-propane diacrylate, 2,2-di-(p-hydroxyphenyl)-propane dimethacrylate, polyoxyethyl-2,2-di-(p-hydroxyphenyl)propane diacrylate, polyoxyethyl-2,2-di-(p-hydroxyphenyl)propane dimethacrylate, 1,3-propanediol diacrylate, an ethoxylated 2-methyl-1,3-propanediol diacrylate, an ethoxylated 2-methyl-1,3-propanediol dimethacrylate, 1,3-propanediol dimethacrylate, 1,4-butanediol diacrylate, 1,4-butanediol dimethacrylate, 1,4-butanediol di-(3-methacryloxy-2-hydroxypropyl)ether, 1,5-pentanediol diacrylate, 1,5-pentanediol dimethacrylate, 2,2,4-trimethyl-1,3-pentanediol diacrylate, 2,2,4-trimethyl-1,3-pentanediol dimethacrylate, 1,4-benzenediol diacrylate, 1,4-benzenediol dimethacrylate, 1,9-nonanediol diacrylate, 1,9-nonanediol dimethacrylate, 1,6-hexanediol diacrylate, 1,6-hexanediol dimethacrylate, 1,4-cyclohexanediol diacrylate, 1,4-cyclohexanediol dimethacrylate, 1,6-hexanediol monoacrylate monomethacrylate, 1,6-hexanediol diglycidyl ether diacrylate, 1,6-hexanediol diglycidyl ether dimethacrylate, a diacrylate aliphatic alkoxyl, an alkoxylated aliphatic dimethacrylate, cyclohexane-1,4-dimethanol-diacrylate, optionally alkoxylated, cyclohexane-1,4-dimethanol-dimethacrylate, optionally alkoxylated, a hexanediol diacrylate, optionally alkoxylated, a hexanediol dimethacrylate, optionally alkoxylated, neopentylglycol diacrylate, neopentylglycol dimethacrylate, neopentylglycol diethoxydiacrylate, neopentylglycol diethoxydimethacrylate, a propoxylated neopentylglycol diacrylate, propoxylated neopentylglycol dimethacrylate, neopentylglycol hydroxypivalate diacrylate modified by a caprolactone, a neopentylglycol hydroxypivalate dimethacrylate modified by a caprolactone, a cyclohexanedimethanol diacrylate, a cyclohexanedimethanol dimethacrylate, glycerol diacrylate, glycerol dimethacrylate, ethylene glycol diacrylate, ethylene glycol dimethacrylate, diethylene glycol diacrylate, diethylene glycol diacrylate phthalate, diethylene glycol dimethacrylate, propylene glycol diacrylate, propylene glycol dimethacrylate, dipropylene glycol diacrylate, dipropylene glycol dimethacrylate, triethylene glycol diacrylate, triethylene glycol dimethacrylate, tripropylene glycol diacrylate, tripropylene glycol dimethacrylate, tetraethylene glycol diacrylate, tetraethylene glycol dimethacrylate, hexamethylene glycol diacrylate, hexamethylene glycol dimethacrylate, 1-phenylethylene-1,2-diacrylate, 1-phenylethylene-1,2-dimethacrylate, decamethylene glycol diacrylate, decamethylene glycol dimethacrylate, butylene glycol diacrylate, butylene glycol dimethacrylate, bisphenol A diacrylate, optionally ethoxylated, bisphenol A dimethacrylate, optionally ethoxylated, bisphenol-A di-(2-acryloxyethyl) ether, bisphenol-A di-(2-methacryloxyethyl)ether, bisphenol-A di-(3-acryloxy-2-hydroxypropyl)ether, bisphenol-A di-(3-methacryloxy-2-hydroxypropyl)ether, a diacrylate polymer such as a poly(ethylene glycol) diacrylate, a dimethacrylate polymer such as a poly(ethylene glycol) dimethacrylate, tricyclodecanedimethanol diacrylate, tricyclodecanedimethanol dimethacrylate, a divinylbenzene, an alkyldivinylbenzene, a divinyltoluene, a divinylketone, a divinylxylene, a divinyl ether such as 1,4-butanediol divinyl ether, diethyleneglycol divinyl ether, cyclohexane dimethanol divinyl ether and triethylene glycol divinyl ether, N,N-methylene-bis-acrylamide, N,N-methylene-bis-methacrylamide, N,N-ethylene-bis-acrylamide, N,N-ethylene-bis-methacrylamide and glyoxal bisacrylamide.

The aqueous solution used at step a) of the method according to the invention may comprise one or more organic compounds with two different radically polymerisable functions.

In particular, the aqueous solution of step a) comprises, as organic compound with two radically polymerisable functions, ethylene glycol dimethacrylate, optionally in a mixture with a poly(ethylene glycol) diacrylate such as a poly (ethylene glycol) diacrylate the molar mass of which is 700 $g{\cdot}mol^{-1}$.

Typically, the organic compound or compounds with two radically polymerisable functions is/are present in the aqueous solution of step a) in a total quantity of between 4% and 20% and in particular between 6% and 18% by mass with respect to the total mass of the aqueous solution of step a). When the aqueous solution of step a) comprises only one organic compound with two radically polymerisable functions, the latter is advantageously present in a quantity of between 8% and 12% and in particular of the order of 10% (i.e. 10%±1%) by mass with respect to the total mass of the aqueous solution of step a). When the aqueous solution of step a) comprises at least two organic compounds with two different radically polymerisable functions, they are advantageously present in a total quantity of between 12% and 18% and in particular of the order of 16% (i.e. 16%±1%) by mass with respect to the total mass of the aqueous solution of step a).

Any organic compound with three radically polymerisable functions can be used in the context of the present invention. Typically, these compounds comprise a hydrocarbon group and three ethylenic unsaturation functions. Such compounds are well known and commercially accessible.

Advantageously, an organic compound with three radically polymerisable functions that is useful in the context of the present invention is selected from the group consisting of pentaerythritol triacrylate, pentaerythritol trimethacrylate, 1,2,4-butanetriol triacrylate, 1,2,4-butanetriol triacrylate trimethacrylate, a glycerol triacrylate, a glycerol trimethacrylate, a glycerol propoxylate triacrylate, a glycerol propoxylate trimethacrylate, trimethylolethane triacrylate, trimethylolethane trimethacrylate, trimethylolpropane triacrylate, trimethylolpropane trimethacrylate, a trimethylolpropane ethoxylate triacrylate, a trimethylolpropane ethoxylate trimethacrylate, a trimethylolpropane propoxylate triacrylate, a trimethylolpropane propoxylate trimethacrylate, tris(2-hydroxyethyl)isocyanurate triacrylate, tris(2-hydroxyethyl)isocyanurate trimethacrylate, 1,3,5-triacryloylhexahydro-1,3,5-triazine, a sorbitol triacrylate, a sorbitol trimethacrylate, diethylenetriamine triacrylamide, a triacrylate polymer such as a poly(ethylene glycol) triacrylate and a trimethacrylate polymer such as a poly(ethylene glycol) trimethacrylate.

The aqueous solution used at step a) of the method according to the invention may comprise one or more organic compounds with three different radically polymerisable functions.

In particular, the aqueous function of step a) comprises, as organic compound with three radically polymerisable functions, trimethylolpropane triacrylate or a trimethylolpropane ethoxylate triacrylate as a trimethylolpropane ethoxylate triacrylate the molar mass of which is 428 $g{\cdot}mol^{-1}$, a trimethylolpropane ethoxylate triacrylate the molar mass of which is 692 $g{\cdot}mol^{-1}$ or a trimethylolpropane ethoxylate triacrylate the molar mass of which is 912 $g{\cdot}mol^{-1}$. More particularly, the aqueous solution of step a) comprises, as organic compound with three radically polymerisable functions, a trimethylolpropane ethoxylate triacrylate the molar mass of which is 428 $g{\cdot}mol^{-1}$.

Typically, the organic compound or compounds with three radically polymerisable functions is/are present in the aqueous solution of step a), in a total quantity of between 1% and 15% and in particular between 2% and 13% by mass with respect to the total mass of the aqueous solution of step a).

Finally, the aqueous solution used during step a) of the method comprises at least one photoinitiator.

"Photoinitiator" means a compound capable, under the action of light and in particular UV light, of initiating a radical polymerisation. Any photoinitiator and in particular any radical photoinitiator can be used in the context of the present invention. Advantageously, the photoinitiator used in the context of the present invention is a radical photoinitiator and, in particular, a type I radical photoinitiator.

The maximum absorption wavelength of the photoinitiator used in the present invention is between 280 nm and 400 nm, in particular between 350 nm and 400 nm.

Typically, a photoinitiator that is useful in the context of the present invention is selected from the group consisting of phosphine oxides such as diphenyl(2,4,6-trimethylbenzoyl) phosphine oxide, diphenylphosphine oxide, triphenylphosphine oxide and acylphosphine oxide; acetophenone and derivatives thereof such as 1-hydroxy-cyclohexyl acetophenone, 2-hydroxy-2,2-dimethyl acetophenone, 2,2-dimethoxy-2-phenyl acetophenone, 2,2-diethoxy acetophenone, 2,2,2-trichloro-butyl acetophenone and 2 hydroxy-4'-(2-hydroxyethoxy) 2 methylpropiophenone; benzoin ethers such as benzoin methyl ether, benzoin ethyl ether, benzoin butyl ether and benzoin isopropyl ether; benzophenone and derivatives thereof such as p-chloro benzophenone and p-phenyl benzophenone; thioxanthone and derivatives thereof such as 2-ethyl thioxanthone, 2-chloro thioxanthone, 2-isopropyl thioxanthone and 1-chloro-4-propoxy thioxanthone; benzyl and derivatives thereof such as alkylated derivatives of benzyl.

In particular, the aqueous solution of step a) comprises, as photoinitiator, 2 hydroxy-4'-(2-hydroxyethoxy) 2 methylpropiophenone.

Typically, the photoinitiator is present, in the aqueous solution of step a) in a quantity of between 1% and 5%, in particular between 2% and 3% and, especially, of the order of 2.5% (i.e. 2.5%±0.3%) by mass with respect to the total mass of the aqueous solution of step a).

The solution used during step a) of the method according to the invention has, as solvent, a solvent based on water, thus justifying the term aqueous solution. "Water" means, in the context of the present invention, mains water, deionised water, distilled water or ultrapure water (18.2 MΩ).

In a particular embodiment, the solvent of the aqueous solution used in step a) comprises only water, i.e. this solvent consists of water.

In a variant, it may comprise at least one other solvent in addition to water. This other solvent may be a polar, protic or aprotic solvent. A person skilled in the art will be able to choose the solvent best adapted according to the compounds with two and three radically polymerisable functions and the photoinitiator used in step a). In particular, this additional solvent may be a hydroxylated solvent such as methanol or ethanol. More particularly, the solvent of the aqueous solution used in step a) is a mixture of water and ethanol and in particular a mixture of deionised water and ethanol. In such a mixture, the mass ratio between water, and in particular deionised water, and ethanol is between 0.4 and 0.8, advantageously between 0.5 and 0.65 and in particular of the order of 0.57 (i.e. 0.57±0.02).

In step a) of the method according to the invention, it is possible to prepare, extemporaneously, the aqueous solution by mixing together the elements constituting it. A person skilled in the art will, without any inventive effort, know the order in which these elements must be mixed and the best way of doing this mixing, according to the nature and the particularities of each of the elements constituting the aqueous solution.

In a variant, it is possible to prepare the aqueous solution in advance and to store it, until it is used in step a). This storage, typically done away from light and at a temperature below 10° C. and in particular of the order of 4° C. (4° C.±3° C.) may be greater than one week, in particular greater than one month and especially greater than two months.

In step a) of the method according to the invention, any liquid deposition technique can be used for putting the aqueous solution into contact with the surface of the object and therefore coating or impregnating the latter with the aqueous solution as previously defined.

Typically, the aqueous solution is deposited on the surface of the object via a technique selected from deposition by immersion or dipping, also known by the English term "dip coating"; deposition by centrifugation or deposition by spinner, also known by the English term "spin coating"; deposition by manual vaporisation or spraying known by the English term "spray coating"; deposition by contact using a stamp inked by the aqueous solution and known by the English term "contact printing", deposition of the "micro-drop" type, also known by the English term "drop coating", and by inkjet printing. Advantageously, in step a) of the method according to the invention, the aqueous solution is deposited on the surface of the object by inkjet printing, also known by the English term "inkjet printing". In fact, the aqueous solution used may be defined as an ink.

Step a) of the method according to the invention is implemented at a temperature of between 5° C. and 40° C., in particular between 10° C. and 30° C. and especially at ambient temperature, i.e. 23° C.±5° C.

The chemical reaction implemented in step (b) is a radical polymerisation. This is because the irradiation of the aqueous solution, in this step, causes the generation of an initiator radical from the photoinitiator present in this solution. This radical reacts with an entity present in the aqueous solution and carrying at least one radically polymerisable function, thus forming the first link of the polymer chain being grown. This entity may be a compound with two radically polymerisable functions, a compound with three radically polymerisable functions or an ionene-type polymer, functionalised by at least one radically polymerisable function. In the propagation step, the macromolecular chain forms by successive additions of such entities on the "macro-radical" being grown. The presence, in the aqueous solution, of compounds with two radically polymerisable functions and of compounds with three radically polymerisable functions makes it possible to obtain, once the radical polymerisation has ended, a three-dimensional polymer network. In fact, the ionene-type polymers present in the aqueous solution are incorporated in this three-dimensional polymer finally obtained, i.e. bonded, covalently, to atoms belonging to this network. It should be noted that this radical polymerisation also involves reactive groups present on the surface of the object by means of which the three-dimensional polymer network finally obtained is fixed, covalently, to this surface.

Advantageously, the irradiation in step b) of the method according to the invention is an irradiation by ultraviolet (UV) radiation.

To do this, an irradiation source, polychromatic or not, such as a light emitting diode, a xenon lamp, a mercury vapour lamp, a laser, a laser diode or a beam of electrons, also known by the English term "electron beam", is used in step b), said source having the particularity of emitting in a part of the UV spectrum lying between 100 nm and 400 nm and in particular between 200 nm and 400 nm. A person skilled in the art will be able to determine, without any inventive effort, the irradiation source best adapted in terms of wavelength according to the characteristics of the photoinitiator present in the aqueous solution.

The duration of irradiation of step b) is between 1 second and 24 hours, in particular between 1 s and 12 h, especially between 1 s and 1 h. Moreover, this irradiation may be continuous or pulsed.

In a particular embodiment, the irradiation in step b) of the method according to the invention consists in subjecting the surface coated with aqueous solution obtained following step a) to a succession of light pulses of UV radiation, also referred to as flash UV. Such a treatment is known by the expression "photonic annealing" or "flash annealing".

Advantageously, the photonic annealing is implemented by a plurality of pulses with a duration of between 50 ms and 300 ms, in particular between 100 ms and 200 ms and, especially of the order of 150 ms (i.e. 150 ms±20 ms), a pause duration between the pulses of between 100 ms and 600 ms, in particular between 200 ms and 400 ms, and especially of the order of 300 ms (i.e. 300 ms±50 ms), a voltage of between 500 V and 3000 V, in particular between 1000 V and 2500 V and especially of the order of 2000 V (i.e. 2000 V±200 V), and a number of pulses of less than or equal to 50, in particular less than or equal to 30, and especially of the order of 20 (i.e. (i.e. 20±5).

Any irradiation source that can be used for implementing a photonic annealing can be used in step b) of the method according to the invention. Advantageously, this irradiation source is a xenon lamp.

A person skilled in the art will, without any inventive effort, be able to decide whether an additional drying step is necessary, in particular according to the constituents of the aqueous solution as previously described and the technique used for depositing this aqueous solution on the surface.

The present invention relates to the aqueous solution used in step a) of the method according to the invention, comprising:

- at least one ionene-type polymer functionalised by at least one radically polymerisable function, in particular as previously defined,
- at least one organic compound with two radically polymerisable functions, in particular as previously defined,
- at least one organic compound with three radically polymerisable functions, in particular as previously defined, and
- a photoinitiator, in particular as previously defined.

Advantageously, the aqueous solution according to the present invention comprises:

- at least one ionene-type polymer functionalised by at least one radically polymerisable function, in particular as previously defined,
- ethylene glycol dimethacrylate, optionally in a mixture with a polyethylene glycol diacrylate,
- trimethylolpropane triacrylate or a trimethylolpropane ethoxylate triacrylate, and
- a photoinitiator, in particular as previously defined.

In particular, the aqueous solution according to the present invention comprises or consists of:

- deionised water,
- ethanol, the mass ratio between deionised water and ethanol being between 0.5 and 0.65,
- an ionene-type polymer functionalised by at least one radically polymerisable function comprising, in its main chain, a concatenation of repetitive units of formula (III):

$$—N^{+}(R1)(R2)\text{-}A\text{-}N^{+}(R3)(R4)\text{-}B— \quad (III)$$

- wherein $R1=R2=R3=R4=CH_3$ and $A=B=C_6H_{12}$,
- said polymer being in a quantity of between 2% and 7% by mass with respect to the total mass of the aqueous solution,
  - ethylene glycol dimethacrylate in a quantity of between 8% and 12% by mass with respect to the total mass of the aqueous solution,
  - trimethylolpropane ethoxylate triacrylate the molar mass of which is 428 $g \cdot mol^{-1}$, in a quantity of between 2% and 13% by mass with respect to the total mass of the aqueous solution, and
  - 2 hydroxy-4'-(2-hydroxyethoxy) 2 methylpropiophenone in a quantity between 2% and 3% with respect to the total mass of the aqueous solution.

The present invention also relates to an object having a surface on which bacteriostatic or bactericidal properties have been conferred in accordance with the method as previously defined. Everything that has been described previously for the object and its surface also applies to this aspect of the invention.

Finally, the present invention relates to the use of such an object, in the health field, for preparing protective garments or coatings. In this application, the object is in particular a textile.

The present invention relates to the use of such an object for packaging and/or storing food products such as fresh food products. The coatings may also make it possible to preserve a flora of technological interest and to eliminate an undesirable flora such as an alteration or pathogenic flora.

The invention also relates to the use of such an object for purifying and/or decontaminating a solution, an object or a surface, in particular in the environmental or hospital field.

Other features and advantages of the present invention will also appear to a person skilled in the art from the reading of the following examples given by way of illustration and non-limitatively, with reference to the accompanying drawings.

DETAILED DISCLOSURE OF PARTICULAR EMBODIMENTS

Figure 1:
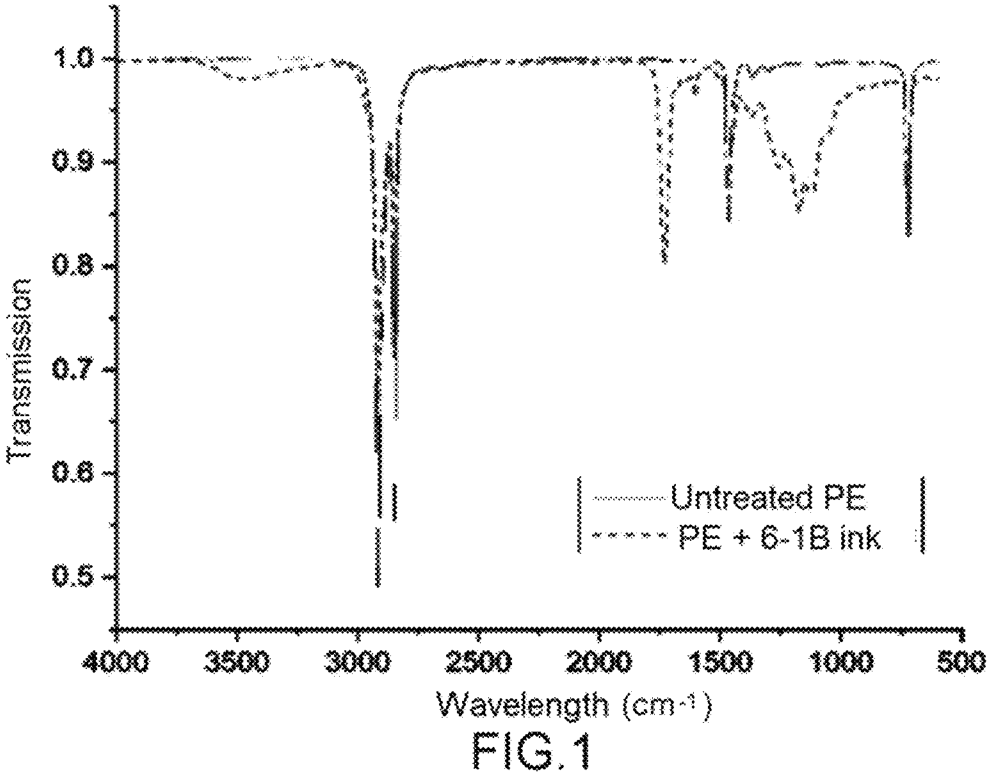
FIG. 1 presents the FTIR spectrum of an ink according to the present invention (ink 6-1B) printed on a PE film and then subjected to photonic annealing, after ultrasound cleaning.

I. Preparation of Inks According to the Present Invention

I.1. Materials

With a view to preparing inks according to the invention, the reagents listed in Table 1 below were ordered from Sigma-Aldrich. The solvents were ordered from CARLO ERBA Reagents. After receipt, all the reagents were used as such, without additional purification.

TABLE 1

| Products necessary for manufacturing the ink | | | |
|---|---|---|---|
| Product | Raw formula | M ($g \cdot mol^{-1}$) | CAS |
| 1,6 dibromohexane | $C_6H_{12}Br_2$ | 243.98 | 629-03-8 |
| N,N,N',N'-tetramethyl-1,6-diaminohexane | $C_{10}H_{24}N_2$ | 172.32 | 111-18-2 |
| Methanol | $CH_4O$ | 32.0 | 67-56-1 |
| Acetone | $C_3H_6O$ | 58.08 | 64-17-5 |
| DMAEMA (2-(Dimethylamino) ethyl methacrylate) | $C_8H_{15}O_2N$ | 157.21 | 2867-47-2 |
| Poly(ethylene glycol) diacrylates 700 | / | 700 | 26570-48-9 |
| Ethylene glycol dimethacrylate | $C_{10}H_{14}O_4$ | 198.2 | 97-90-5 |
| Trimethylpropane triacrylates | $C_{15}H_{20}O_6$ | 296.3 | 15625-89-5 |
| Trimethylolpropane ethoxylate triacrylate 428 | / | 428 | 28961-43-5 |
| Trimethylolpropane ethoxylate triacrylate 692 | / | 692 | 28961-43-5 |
| Trimethylolpropane ethoxylate triacrylate 912 | / | 912 | 28961-43-5 |
| 2 hydroxy-4'-(2-hydroxyethoxy) 2 methylpropiophenone | $C_{12}H_{16}O_4$ | 224.3 | 106797-53-9 |

I.2. Synthesis of Polyionene: PI 6-6

All the compounds are introduced by means of a syringe into a 50 mL three-necked flask under inert atmosphere surmounted by a refrigerant, in the following order: N,N,N',N'-tetramethyl-1,6-diaminohexane (4.3 mL, 0.0224 mol), 11 mL of methanol, 1,6-dibromohexane (3.4 mL, 0.0224 mol) and 11 mL of methanol.

The reaction mixture, homogeneous and clear, is heated at 65° C. for 17 h under stirring. The reaction is stopped by putting the flask in an ice bath. The mixture obtained is precipitated by adding it dropwise in 300 mL of acetone. The precipitate obtained is filtered over a Büchner flask and dried.

A white solid is obtained with a mass m=8.86 g. $^1H$ NMR ($D_2O$, δ in ppm): 1.39 (s, 8H); 1.74 (s, 8H); 2.83 (s, 0.27H, amine end); 3.01 (s, 12H); 3.23-3.30 (m, 8H); 3.46-3.49 (t, 0.38H, brominated end).

The polyionene thus obtained is the PI 6-6 of formula:

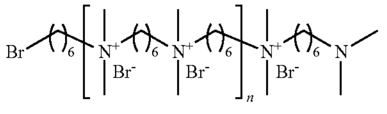

I.3. Synthesis of Functionalised PI 6-6

With a view to functionalising PI 6-6 implemented on the brominated ends of this polymer, it is sought first of all to increase the brominated chain ends thereof.

In a 350 mL three-neck flask surmounted by a refrigerant, PI 6-6 (8.0214 g, 0.0028 mol) is introduced and then, once the assembly is closed, the solid is put under inert atmosphere. 100 mL of methanol is added with a glass syringe and complete dissolution of the solid is obtained. 1,6-dibromohexane (9 mL, 0.059 mol) is introduced by means of a syringe, and then 18 mL of methanol.

The reaction mixture is heated at 65° C. for 24 h under stirring. The reaction is stopped by putting the flask in an ice bath. The mixture is next poured, dropwise, into 300 mL to 1300 mL of acetone. The precipitate obtained is then filtered on a Büchner flask and then dried.

A white solid is obtained with a mass m=6.56 g. $^1H$ NMR ($D_2O$, δ in ppm): 1.39 (s, 8H); 1.74 (s, 8H); 2.83 (s, 0.22H, amine end); 3.01 (s, 12H); 3.23-3.30 (m, 8H); 3.46-3.49 (t, 0.49H, brominated end).

The polyionene with brominated ends thus obtained is the PI 6-6 Br of formula:

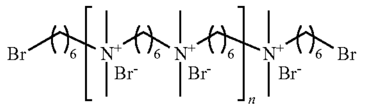

In a 250 mL three-necked flask surmounted by a refrigerant, the PI 6-6 Br (6.00 g, 0.0021 mol) is introduced and then, once the assembly is closed, the solid is put under inert atmosphere. 90 mL of methanol is added with a glass syringe and complete dissolution of the solid is awaited. 2-(Dimethylamino)ethyl methacrylate (36 mL, 0.2137 mol) is introduced by means of a glass syringe, and then 16 mL of methanol.

The reaction mixture is heated at 65° C. for 48 h under stirring. The reaction is stopped by putting the flask in an ice bath. The mixture is next poured, dropwise, into 300 mL to 1400 mL of acetone. The precipitate obtained is filtered on a Büchner flask and then dried.

A white solid is obtained of mass m=5.56 g. $^1H$ NMR ($D_2O$, δ in ppm): 1.39 (s, 8H); 1.74 (s, 8H); 2.15 (s, 0.07H, DMAEMA end); 2.66-2.69 (t, 0.12H, DMAEMA end); 2.81 (s, 0.07H, amine end); 3.01 (s, 12H); 3.23-3.30 (m, 8H); 3.46-3.49 (t, 0.03H, brominated end); 3.97 (s, 0.21H, DMAEMA end); 5.37 (1, 0.004H, DMAEMA end); 5.57 (s, 0.004H, DMAEMA end).

The functionalised polyionene thus obtained is the functionalised PI 606 of formula:

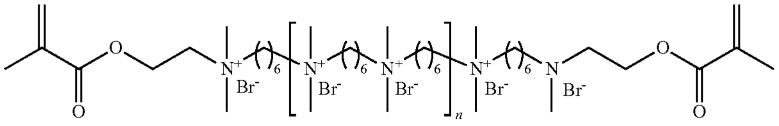

The functionalised PI 6-6 used in the inks according to the invention has a molar mass of around 3000 $g \cdot mol^{-1}$.

I.4. Formulations of the Inks

The functionalised PI 6-6 is soluble only in water or methanol, and the other components of the inks in ethanol. Consequently, the solvent of the inks was selected so as to be capable of solubilising all the compounds, evaporating rapidly during crosslinking and conferring to the ink an ideal viscosity for deposition in inkjet printing. This solvent is a mixture of ethanol and deionised water.

Each of the inks is prepared by weighing the liquid and solid compounds precisely and separately. Next, the mixture of the liquid compounds is left to stir for at least 1 h. This mixture is added to the mixture of solids and the formulation is left to stir for at least 1 night.

Finally, the ink is filtered on a 13 mm diameter syringe filter made of PTFE with a porosity of 0.45 μm. The formulation is next stored away from light at 4° C. to preserve the activity of the photoinitiator. It can thus be stored for several months. It should be noted that a test was carried out with an ink reused 2 months after manufacture thereof.

The formulations of the various inks produced are supplied in Tables 2 to 8 below.

TABLE 2

Formulation of ink 6-1B

| Components | Mass % | Mass (g) | Mn ($g \cdot mol^{-1}$) |
|---|---|---|---|
| Deionised water | 27.4% | 2.500 | 18 |
| Ethanol | 48.6% | 4.440 | 46.1 |
| Double-bond functionalised polyionene | 4.2% | 0.380 | 3212 |
| Ethylene glycol dimethacrylate | 10.9% | 1.000 | 198.2 |
| Trimethylolpropane ethoxylate triacrylate 428 | 6.2% | 0.566 | 428 |
| 2 hydroxy (4' hydroxyethoxy) 2 methylpropiophenone | 2.7% | 0.250 | 224.3 |

TABLE 3

Formulation of ink 4-5

| Components | Mass % | Mass (g) | Mn ($g \cdot mol^{-1}$) |
|---|---|---|---|
| Deionised water | 26.8% | 2.500 | 18 |
| Ethanol | 47.6% | 4.440 | 46.1 |
| Poly(ethylene glycol) diacrylates 700 | 5.4% | 0.500 | 700 |
| Double-bond functionalised polyionene 6-6 | 4.1% | 0.380 | 3212 |
| Ethylene glycol dimethacrylate | 10.7% | 1.000 | 198.2 |
| Trimethylpropane triacrylates | 2.7% | 0.250 | 296.3 |
| 2 hydroxy (4' hydroxyethoxy) 2 methylpropiophenone | 2.7% | 0.250 | 224.3 |

TABLE 4

Formulation ink 6-1A

| Components | Mass % | Mass (g) | Mn ($g \cdot mol^{-1}$) |
|---|---|---|---|
| Deionised water | 26.5% | 2.500 | 18 |
| Ethanol | 47.1% | 4.440 | 46.1 |
| Poly(ethylene glycol) diacrylates 700 | 5.3% | 0.500 | 700 |
| Double-bond functionalised polyionene 6-6 | 4.0% | 0.380 | 3212 |
| Ethylene glycol dimethacrylate | 10.6% | 1.000 | 198.2 |
| Trimethylolpropane ethoxylate triacrylate 428 | 3.8% | 0.361 | 428 |
| 2 hydroxy (4' hydroxyethoxy) 2 methylpropiophenone | 2.7% | 0.250 | 224.3 |

TABLE 5

Formulation of ink 6-2A

| Components | Mass % | Mass (g) | Mn ($g \cdot mol^{-1}$) |
|---|---|---|---|
| Deionised water | 25.9% | 2.500 | 18 |
| Ethanol | 46.0% | 4.440 | 46.1 |
| Poly(ethylene glycol) diacrylates 700 | 5.2% | 0.500 | 700 |
| Double-bond functionalised polyionene 6-6 | 3.9% | 0.380 | 3212 |
| Ethylene glycol dimethacrylate | 10.4% | 1.000 | 198.2 |
| Trimethylolpropane ethoxylate triacrylate 692 | 6.1% | 0.585 | 692 |
| 2 hydroxy (4' hydroxyethoxy) 2 methylpropiophenone | 2.6% | 0.250 | 224.3 |

TABLE 6

Formulation of ink 6-2B

| Components | Mass % | Mass (g) | Mn ($g \cdot mol^{-1}$) |
|---|---|---|---|
| Deionised water | 26.4% | 2.500 | 18 |
| Ethanol | 46.8% | 4.440 | 46.1 |
| Double-bond functionalised polyionene 6-6 | 4.0% | 0.380 | 3212 |
| Ethylene glycol dimethacrylate | 10.5% | 1.000 | 198.2 |
| Trimethylolpropane ethoxylate triacrylate 692 | 9.6% | 0.915 | 692 |
| 2 hydroxy (4' hydroxyethoxy) 2 methylpropiophenone | 2.6% | 0.250 | 224.3 |

TABLE 7

Formulation of ink 6-3A

| Components | Mass % | Mass (g) | Mn ($g \cdot mol^{-1}$) |
|---|---|---|---|
| Deionised water | 25.4% | 2.500 | 18 |
| Ethanol | 45.1% | 4.440 | 46.1 |
| Poly(ethylene glycol) diacrylates 700 | 5.1% | 0.500 | 700 |
| Double-bond functionalised polyionene 6-6 | 3.9% | 0.380 | 3212 |
| Ethylene glycol dimethacrylate | 10.2% | 1.000 | 198.2 |
| Trimethylolpropane ethoxylate triacrylate 912 | 7.8% | 0.770 | 912 |
| 2 hydroxy (4' hydroxyethoxy) 2 methylpropiophenone | 2.5% | 0.250 | 224.3 |

TABLE 8

Formulation of ink 6-3B

| Components | Mass % | Mass (g) | Mn ($g \cdot mol^{-1}$) |
|---|---|---|---|
| Deionised water | 25.6% | 2.500 | 18 |
| Ethanol | 45.4% | 4.440 | 46.1 |
| Double-bond functionalised polyionene 6-6 | 3.9% | 0.380 | 3212 |
| Ethylene glycol dimethacrylate | 10.2% | 1.000 | 198.2 |
| Trimethylolpropane ethoxylate triacrylate 912 | 12.3% | 1.205 | 912 |
| 2 hydroxy (4' hydroxyethoxy) 2 methylpropiophenone | 2.6% | 0.250 | 224.3 |

It should be noted that by selecting trimethylolpropane ethoxylate triacrylate as compound with three radically polymerisable polyethylene glycol functions, it was possible to dispense with the presence of polyethylene glycol diacrylate used in the first ink formulations.

II. Printing and Annealing of the Inks According to the Present Invention

The inks are next used on a DIMATIX inkjet printer. Approximately 2 mL of each of the inks is introduced into cartridges with a print head having 16 nozzles each delivering 10 picolitres. The printings are performed with a drop spacing of 50 μm to 1 mm of the surface to be printed (PE, PVC, PET).

Once printed, the surface undergoes an annealing under the Xenon 52200 lamp that covers all the wavelengths from 250-300 nm to 1000-1200 nm with 2000 V flashes for 150 milliseconds and then an absence of flash for 300 milliseconds. The series of flashes is repeated 20 times.

Once the annealing has been carried out, the printed crosslinked surfaces are introduced into a mixture of deionised water and ethanol (50/50) and put under ultrasound at full power for 10 minutes.

For all the inks the formulations of which are supplied in Tables 2 to 8, a film of the crosslinked solid deposit type is obtained after photonic annealing, consisting of a three-dimensional network, obtained from the various compounds with radically polymerisable functions, contained in the ink. Polyionene is thus incorporated covalently in this network.

Among the various inks tested, ink 6-1B allows to obtain the most homogeneous coating.

III. Characterisation of the Crosslinked Solids Deposit

III.1. Covalent Grafting on the Printed Surface

After the printings, the samples with the deposits resulting from the 6-1B ink were cleaned with ultrasound for 10 minutes in a water/ethanol mixture (50/50). These cleaned samples were next analysed by infrared spectroscopy (FTIR) and XPS, to attest to the presence of the deposits and maintenance thereof after ultrasound cleaning.

PE Surface

The analyses by XPS and FTIR spectroscopies show that the films obtained are grafted covalently on the printed PE surface.

Indeed, on FIG. 1, the presence of the ink is observed on the polyethylene after a cleaning of 10 minutes in an ultrasound bath in a water/ethanol mixture (50/50).

PVC Surface

Figure 2:
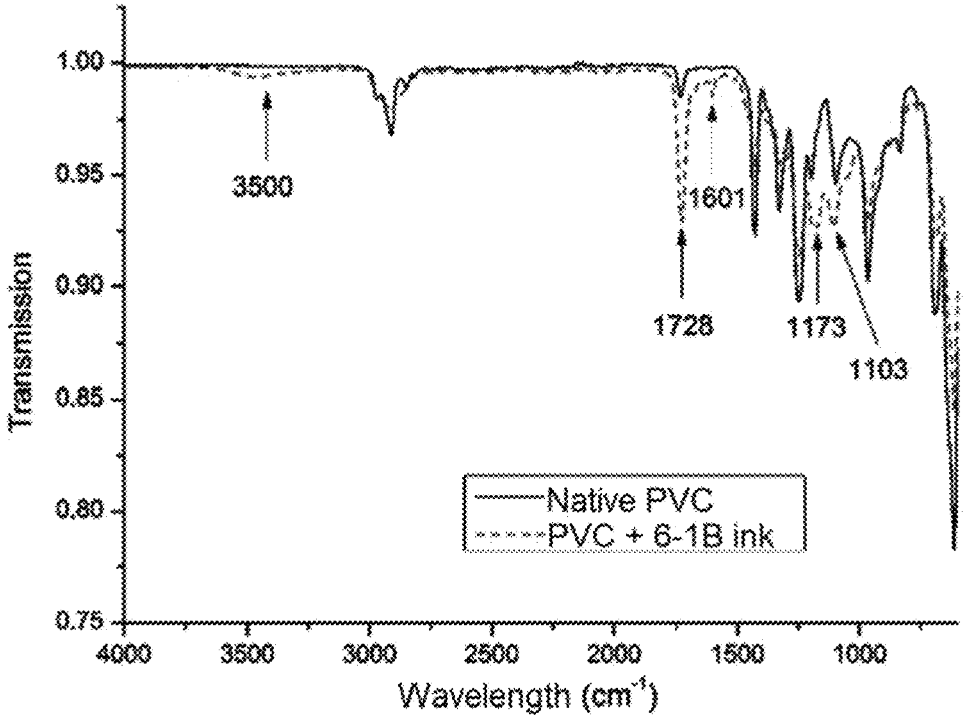
FIG. 2 presents the FTIR spectrum of native PVC and PVC with the 6-1B ink according to the present invention.

The FTIR spectrum attests to the maintenance of the 6-1B ink on the PVC through the presence of the characteristic peaks, which can be attributed to the ink (FIG. 2). The peak at 3500 $cm^{-1}$ corresponds to the elongation of the O—H bonds. The peak at 1728 $cm^{-1}$ corresponds to the elongation of the C═O bonds (esters). The peak at 1601 $cm^{-1}$ corresponds to the elongation of the C═C bonds (alkenes). The peaks at 1173 and 1103 $cm^{-1}$ correspond to the elongation of the C—O—C bonds (ethers).

Figure 3A:
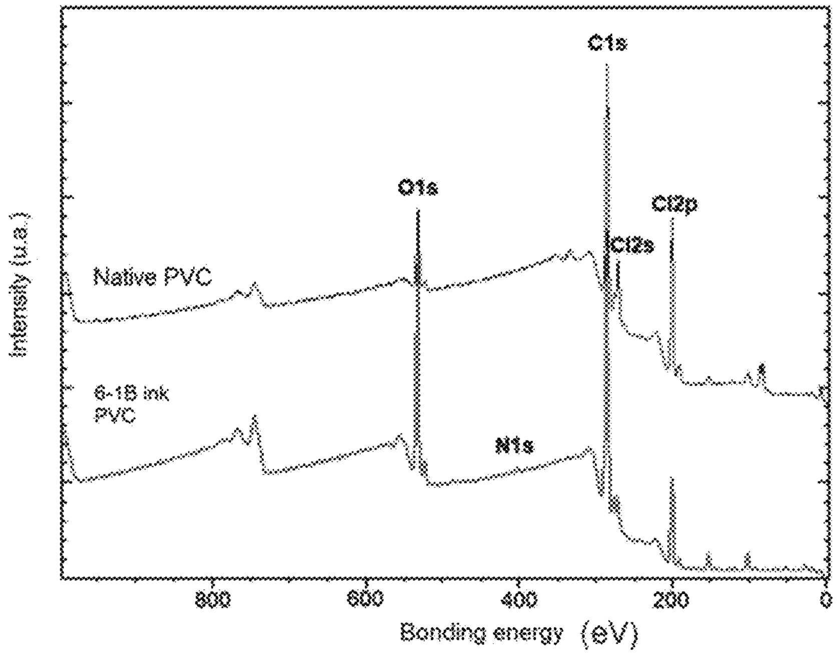
FIG. 3 presents the global spectra of the surfaces of native PVC and PVC with the 6-1B ink (FIG. 3A) and the high-resolution spectrum of the N 1s of PVC with the 6-1B ink (FIG. 3B).
Figure 3B:
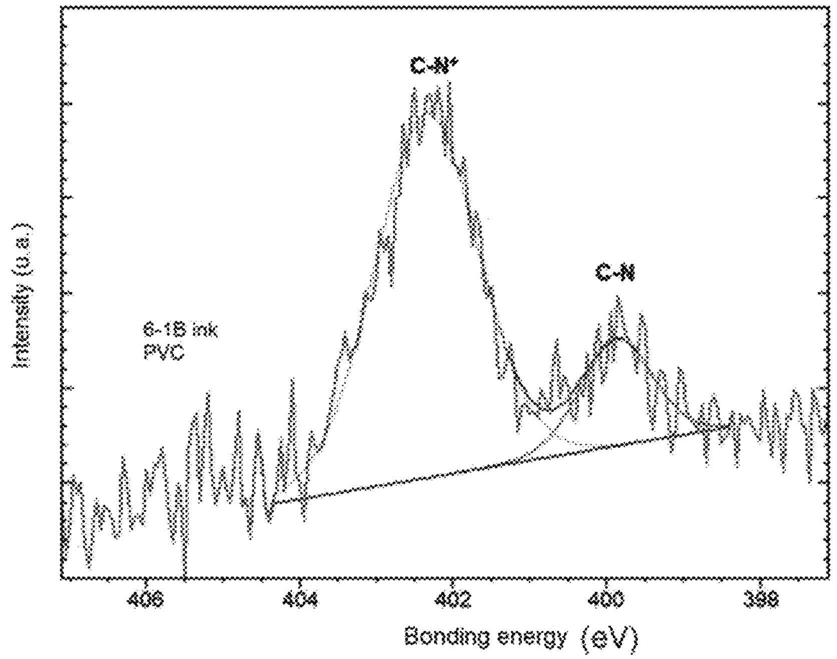

The global XPS spectrum at N 1s high resolution of the PVC 6-1B ink (FIG. 3) also corroborates the presence of the deposit on the PVC. The nitrogen contribution, characteristic of the presence of PI, is in fact visible only on the global spectrum of the 6-1B ink PVC (FIG. 3A). In addition, the N 1s high-resolution spectrum indicates that the contribution of the C—$N^+$ bonds, at 402 eV, is in the majority (FIG. 3B). This contribution is characteristic of the quaternary ammoniums present in the skeleton of the PI.

The atomic percentages determined on the global spectra and the high-resolution spectrum of the nitrogen are set out in Tables 9 and 10 below.

TABLE 9

Chemical compositions of the native PVC and 6-1B ink PVC (atomic %) determined on the global spectra

| Layer | C1s | O1s | Cl2p | Si2p | N1s |
|---|---|---|---|---|---|
| Native PVC | 69.2 | 7.5 | 18.1 | 5.2 | — |
| PVC + 6-1B ink | 70.1 | 17.6 | 7.7 | 4.2 | 0.5 |

TABLE 10

N 1s contributions (atomic %) determined on the high-resolution spectrum of the 6-1B ink PVC

| Layer | C—N 399 eV | C—$N^+$ 402 eV |
|---|---|---|
| PVC + 6-1B ink | 16.8 | 83.2 |

PET Surface

Figure 4:
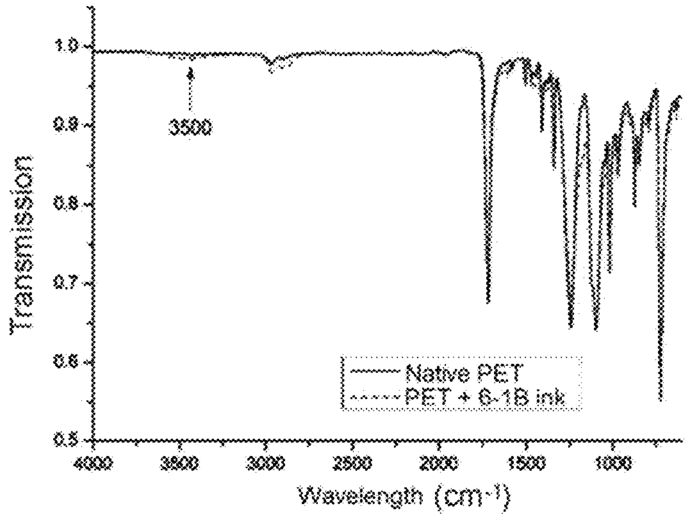
FIG. 4 presents the FTIR spectrum of native PET and PET with the 6-1B ink according to the present invention.

In the case of the 6-1B ink PET, the FTIR spectrum does not make it possible to confirm the presence of ink, after ultrasound cleaning, since the spectrum obtained is similar to that of the native PET (FIG. 4).

Figure 5A:
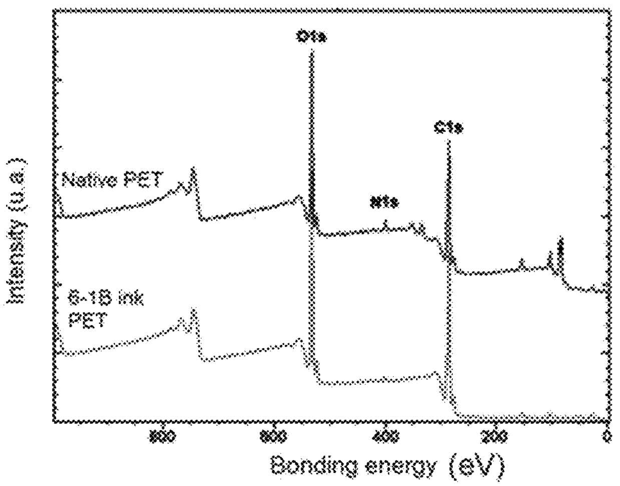
FIG. 5 presents the global spectra of the surfaces of native PET and PET with the 6-1B ink (FIG. 5A) and the high-resolution spectra of the N 1s on these same surfaces (FIG. 58).
Figure 5B:
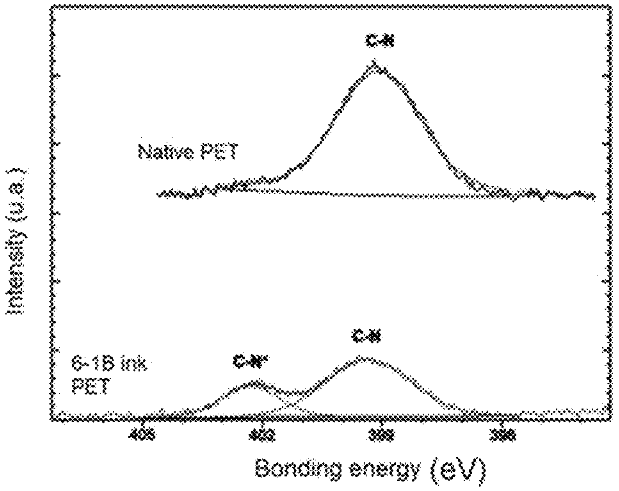

On the other hand, the XPS analyses show clearly the presence of the deposit of 6-1B ink, after ultrasound cleaning. The nitrogen contribution is present both on the global spectrum of the native PET and the global spectrum of the 6-1B ink PET (FIG. 5A). Nevertheless, the N 1s high-resolution spectra make it possible to note a difference in contribution (FIG. 5B). Indeed, on the N 1s high-resolution spectrum of the native PET, the contribution is a single peak that corresponds to the C—N bonds, whereas on the 6-1B ink PET spectrum the contribution consists of two peaks corresponding to the C—N and C—$N^+$ bonds. This double peak is characteristic of the presence of PI. Thus, through these analyses, the deposit of ink on the PET films is also established.

The atomic percentages determined on the global spectra and the high-resolution spectra of nitrogen are set out in Tables 11 and 12 below.

TABLE 11

Chemical compositions of the native PET and 6-1B ink PET (atomic %) determined on the global spectra

| Layer | C1s | O1s | Si2p | N1s |
|---|---|---|---|---|
| Native PET | 59.4 | 25.8 | 11.9 | 2.9 |
| PET + 6-1B ink | 70.4 | 25.8 | 2.3 | 1.6 |

TABLE 12

N 1s contributions (atomic %) determined on the high-resolution spectra of native PET and 6-1B ink PET 6-18

| Layer | C—N 399 eV | C—$N^+$ 402 eV |
|---|---|---|
| Native PET | 100 | — |
| PET + 6-1B ink | 73.0 | 27.0 |

III.2. Importance of the Functionalisation of the Polyionenes

In order to demonstrate the importance of the functionalisation of the PIs in the crosslinking step of the method according to the invention, a supplementary ink without functionalised PI 6-6 was produced. This ink, called 7-1B, is a formulation with the same reagents and proportions as the 6-1B ink as defined in Table 2 above but, for the 7-1B ink, a PI 6-6 without crosslinkable function (double bonds) is used rather than the functionalised PI 6-6 as in the 6-18 ink. These two inks were next printed and crosslinked on PE films in accordance with the protocol described at point II above.

Once the inks have been printed and crosslinked, the printed PE substrates are cleaned with ultrasound in a water/ethanol mixture (50/50) and then dried under a vacuum bell jar, before XPS analysis.

Figure 6A:
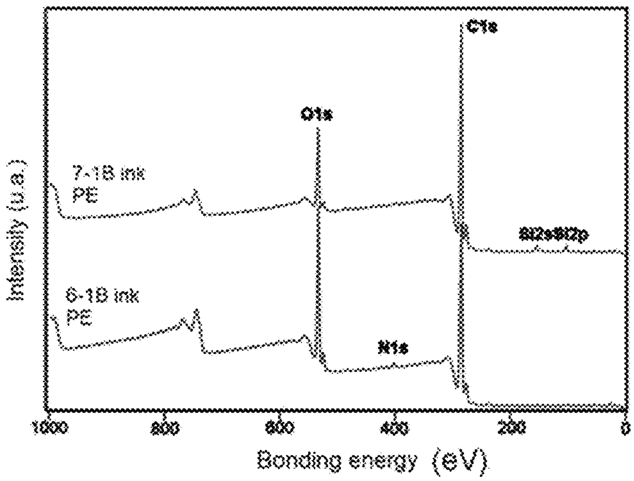
FIG. 6 presents the global spectra of the surfaces of PE with the 6-1B ink according to the present invention and the 7-1B ink without PI with at least one radically polymerisable function and therefore not forming part of the invention (FIG. 6A) and the high-resolution spectrum of the N 1s on PE with the 6-1B ink (FIG. 6B).
Figure 6B:
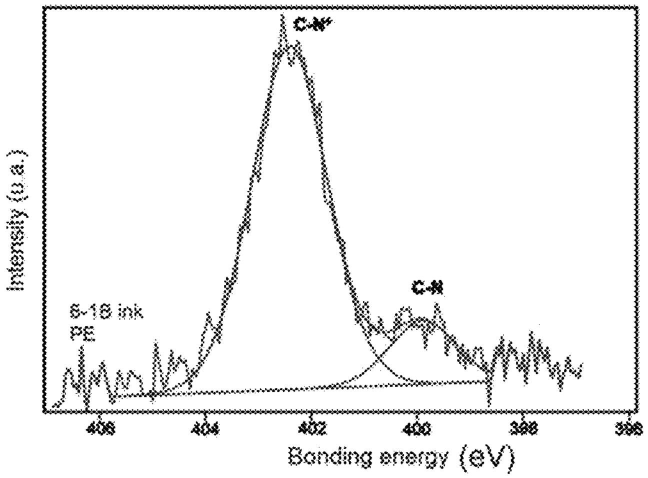

Among all the components of the ink, only the PI 6-6 has nitrogens in its structure. Thus, the presence of a nitrogen contribution on the global spectrum (FIG. 6A) attests to the presence of PI 6-6 in the deposit made with the 6-18 ink. No nitrogen contribution is on the other hand detected in the deposit obtained from the 7-1B ink.

The need for the functionalisation of the PI 6-6 with a double bond for allowing the integration of the polymer in the network, during the crosslinking of the ink and anchoring thereof on the surface, is thus demonstrated. Without this functionalisation, the PI 6-6 is eliminated by the ultrasound cleaning since it does not form covalent bonds with the crosslinked ink.

Figure 7:
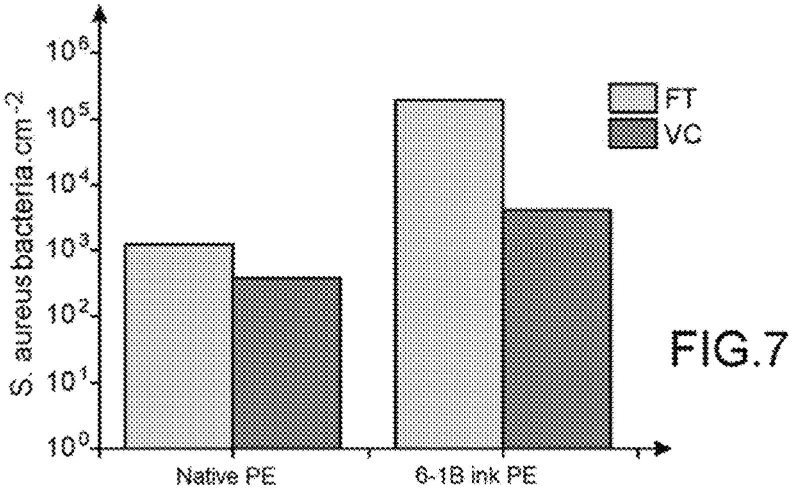
FIG. 7 presents the 3 h adhesion at 37° C. of *S. aureus* on a film of native PE and on a film of PE modified with 6-1B ink in accordance with the method according to the invention with FT=total flora and VC=cultivatable viable.

The atomic percentages determined on the global spectra and the high-resolution spectrum of the nitrogen are set out in Tables 13 and 14 below. The high-resolution spectrum of the N 1s of the PE with the 6-1B ink can be divided into two contributions (FIG. 7B). The contribution at 402 eV is characteristic of the C—N$^+$ bonds and is in the majority with respect to the contribution at 400 eV of the C—N bonds.

TABLE 13

Chemical compositions of the PEs with 6-1B ink and 7-1B ink (atomic %) determined on the global spectra

| Layer | C1s | O1s | N1s | Si2p |
|---|---|---|---|---|
| 6-1B ink PE | 76.2 | 22.4 | 0.8 | 0.6 |
| 7-1B ink PE | 95.9 | 2.4 | — | 1.6 |

TABLE 14

Contributions (atomic %) N 1s determined on the high-resolution spectrum of the 6-1B ink PE

| Layer | C—N 399 eV | C—N$^+$ 402 eV |
|---|---|---|
| 6-1B ink PE | 13.7 | 86.3 |

III.3. Bacterial Adhesion Tests

The adhesion tests are tests that allow to study the pro- or anti-adhesive effect of the surfaces modified according to the method of the invention and their bactericidal character, by depositing bacteria on these surfaces.

Firstly, the total quantity of bacteria that adhered to the surface, called total flora (FT), is evaluated, by means of a microscope observation and a counting of the bacteria on the photographic exposures.

Secondly, the quantity of living bacteria capable of multiplying after the exposure to the modified surfaces, referred to as adherent cultivatable viable bacteria (VC), is evaluated, by detaching them and counting them on a gelose culture medium.

The first biological tests are adhesion tests implemented with *Staphylococcus aureus* (*S. aureus*) in distilled water for 3 h at 37° C. with a bacterial suspension at $10^6$ UFC·mL$^{-1}$ (Unit Forming Colonies·mL$^{-1}$). These tests make it possible to attest to the pro-adhesive properties of the ink since, in FIG. 1, an increase is noted in the total flora present on the PE film modified with the 6-1B ink compared with the PE film without treatment.

These tests also reveal a bactericidal effect of the ink. On FIG. 7, it is observed that the difference between the quantity of adherent cultivatable viable bacteria with respect to the total flora on the PE film modified with the 6-1B ink is greater than this same difference for the PE film without treatment. This reduction is approximately 1.7 log for the PE sample modified with the 6-1B ink as against 0.5 log for the PE without treatment. Which corresponds to inhibition efficiencies (calculated by taking account of the total flora) of 97.9% for the PE modified with the 6-1B ink, as against 69.9% for the untreated PE.

III.4. Salting-Out Test

To study a possible salting out of polyionene from the crosslinked solid, the supernatants of the adhesion tests were counted. It is a case of checking whether the bacteria are inhibited by the PE film with the crosslinked 6-1B ink, in contact with the surface and/or by the suspension submerging the material.

Figure 8:
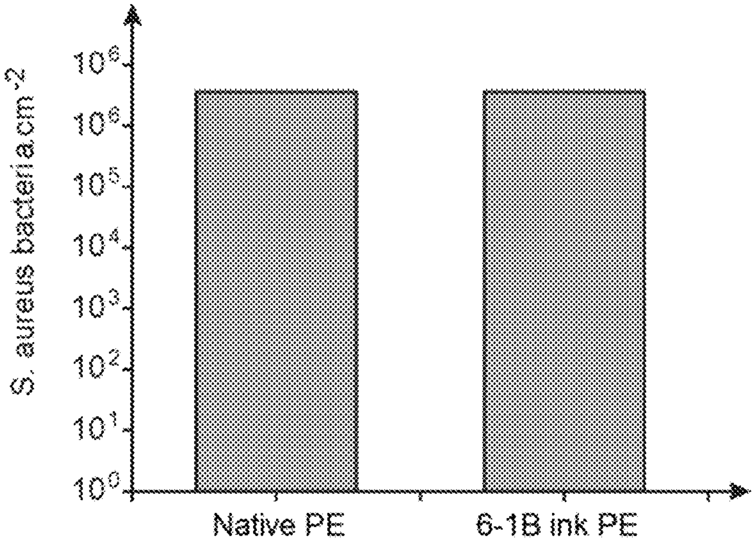
FIG. 8 presents the count of the adhesion supernatants of *S. aureus* on a film of native PE and on a film of PE modified with 6-1B ink in accordance with the method according to the invention.

The counting of the cultivatable viable bacteria on FIG. 8 shows that there is no difference between the supernatants of the PE film without treatment and the PE film modified via the bacteriostatic ink. It is deduced from this that there is no salting out of the polyionenes in the supernatant and that the bacterial inhibition is solely due to the contact with the PE film modified with the crosslinked 6-1B ink.

III.5. Cytotoxicity Test

Cytotoxicity tests were performed according to two distinct methods:

firstly, on cell layers of mouse fibroblasts (L929) after an exposure of 48 h to the PE films modified with PI ink (6-1B ink PE); and secondly, on reconstructed human epidermises (Skin+) after an exposure of 24 h to the films of 6-1B ink PE. The tests were repeated three times for each of the tests.

Figure 9:
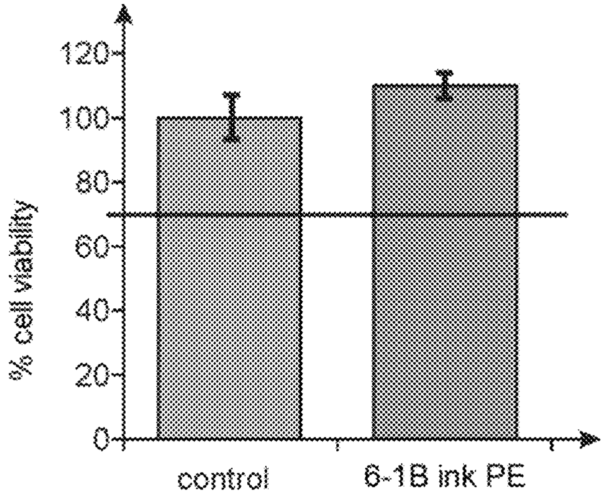
FIG. 9 presents the cytotoxicity results on cell layers of mouse fibroblasts (L929) after exposure for 48 h to films of PE modified with the 6-1B ink (ink 6-1B PE) in accordance with the method according to the invention (n=3). The control corresponds to the same culture medium but without PE film modified or not.

For the test on the L929, the 6-1B ink PE floats above the cell layer in the wells, and therefore the effect of the salting out is evaluated in this case (FIG. 9). The tests do not indicate cytotoxicity of the 6-1B ink PE since the cell viability is above 70% and is comparable with that of the control. This is because the statistical tests (Student) gave a p-value>0.05, and therefore the difference is not significant between the two conditions.

Figure 10:
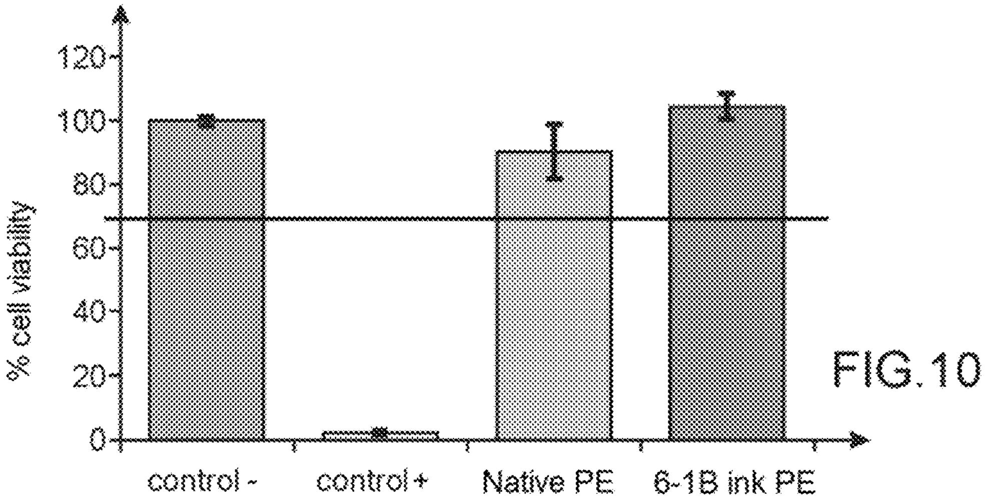
FIG. 10 presents the cytotoxicity results on human epidermises reconstructed after exposure of 24 h in the presence of PBS to films of non-modified PE (native PE) and to films of PE modified with the 6-1B ink (ink 6-1B PE) in accordance with the method according to the invention (n=3). The negative control corresponds to PBS alone and the positive control to PBS with a latex glove extract.

In tests on the reconstructed human epidermises, the native PE and the 6-1B ink PE are in direct contact with the epidermises. The tests do not indicate cytotoxicity of the native PE and of the 6-1B ink PE since the cell viabilities are above 70% (FIG. 10).

The Student test however indicates a significant difference between the negative control and the native PE (p-value=0.03), as well as a significant difference between the negative control and the 6-1B ink PE (p-value=0.01). The test being performed on only three materials, it can be considered that this significant difference is probably due to experimental error. In particular in the case of the 6-1B ink PE where an increase in the cell viability is rather observed, rather than a reduction, compared with the negative control.

Thus, these two types of cell test indicate clearly that no cytotoxicity is shown for the PE films with deposits of 6-1B ink (containing bacteriostatic PI 6-6 polyionene).

BIBLIOGRAPHY

[1] Dhende et al, *ACS Appl. Mater. Interfaces* 2011, 3, 2830-2837.
[2] Dhenavi et al, *J. Appl. Polym. Sci.* 2013, 127, 1180-1190.
[3] Carvalho et al, *Applied Surface Science* 2014, 307, 548-557.
[4] Palza, *Int. J. Mol. Sci.* 2015, 16, 2099-2116.
[5] Arroyo et al, *RSC Adv.* 2014, 4, 51451-51458.
[6] Lewinski et al, *Small* 2008, 4, 26-49.
[7] Guerra et al, *J. Food Prot.* 2005, 68, 1012-1019.
[8] Del Nobile et al, *Journal of Food Engineering* 2009, 93, 1-6.

[9] Nostro et al, *Appl. Microbiol. Biotechnol.* 2012, 96, 1029-1038.
[10] Min et al, *Biomaterials* 2014, 35, 2507-2517.
[11] Li et al, *RSC Adv.* 2012, 2, 4031-4044.
[12] Kurt et al, *Langmuir* 2007, 23, 4719-4723.
[13] Strassburg et al, *Macromol. Biosci.* 2015, 15, 1710-1723.
[14] Lou et al, *Acta Biomaterialia* 2018, 78, 78-88.
[15] Mattheis et al, *Macromol. Biosci.* 2012, 12, 341-349.
[16] Liu et al, *Biomaterials* 2017, 127, 36-48.
[17] U.S. Pat. No. 4,980,067 published on 25 Dec. 1990.
[18] International application WO 2008/049108 published on 24 Apr. 2008.
[19] International application WO 2008/078052 published on 3 Jul. 2008.

What is claimed is:

1. A method for conferring bacteriostatic or bactericidal properties on a surface of an object, comprising:

(a) putting said surface into contact with an aqueous solution comprising:
- at least one ionene-type polymer functionalised by at least one radically polymerisable function,
- at least one organic compound with two radically polymerisable functions,
- at least one organic compound with three radically polymerisable functions, and
- a photoinitiator, (b) subjecting said surface in contact with said aqueous solution to an irradiation by means of which a radical polymerisation is initiated and a grafted three-dimensional polymer network comprising polymers of the ionene type is obtained.

2. The method according to claim 1, wherein, prior to said step a), said surface is subjected to an oxidising treatment and/or an organic sublayer is formed on said surface.

3. The method according to claim 1, wherein said ionene-type polymer functionalised by at least one polymerisable function is prepared via a polyaddition involving at least one diamine of formula (I):

(R1)(R2)N-A-N(R3)(R4) (I)

wherein
- R1, R2, R3 and R4, identical or different, represent a hydrogen atom, an alkyl group, optionally substituted, or an aryl group, optionally substituted; and
- A is a chain selected from the group consisting of an alkylene chain, optionally substituted, an alkenylene or alkynylene chain, optionally substituted, an arylene chain, optionally substituted, an alkylarylene chain, optionally substituted, and an arylalkylene chain, optionally substituted, and
- at least one dihalide of formula (II):

(R5)-B—(R6) (II)

wherein
- R5 and R6, identical or different, represent a halogen; and
- B is a chain selected from the group consisting of an alkylene chain, optionally substituted, an alkenylene or alkynylene chain, optionally substituted, an arylene chain, optionally substituted, an alkylarylene chain, optionally substituted, and an arylalkylene chain, optionally substituted.

4. The method according to claim 3, wherein said polyaddition step is followed by an operation during which a function or a plurality of functions, identical or different, substituting the ionene-type polymer is/are replaced by one or more radically polymerisable functions.

5. The method according to claim 1, wherein said organic compound with two radically polymerisable functions is ethylene glycol dimethacrylate, optionally in a mixture with a poly(ethylene glycol) diacrylate.

6. The method according to claim 1, wherein said organic compound with three radically polymerisable functions is trimethylolpropane triacrylate or a trimethylolpropane ethoxylate triacrylate.

7. The method according to claim 1, wherein said photoinitiator is 2-hydroxy-4'-(2-hydroxyethoxy)-2-methylpropiophenone.

8. The method according to claim 1, wherein the solvent of said aqueous solution is a mixture of water and ethanol and in particular a mixture of deionised water and ethanol.

9. The method according to claim 1, wherein, in said step a), the aqueous solution is deposited on said surface by inkjet printing.

10. The method according to claim 1, wherein the irradiation in said step b) is a photonic annealing comprises subjecting said surface coated with aqueous solution obtained following said step a) to a succession of light pulses of UV radiation.

11. An aqueous solution used during step a) of a method according to claim 1, comprising:
- at least one ionene-type polymer functionalised by at least one radically polymerisable function,
- at least one organic compound with two radically polymerisable functions,
- at least one organic compound with three radically polymerisable functions, and
- a photoinitiator.

12. The aqueous solution according to claim 11, wherein it comprises or consists of:
- deionised water,
- ethanol, the mass ratio between deionised water and ethanol being between 0.5 and 0.65,
- an ionene-type polymer functionalised by at least one radically polymerisable function comprising, in its main chain, a concatenation of repetitive units of formula (III):

$$—N^{+}(R1)(R2)\text{-}A\text{-}N^{+}(R3)(R4)\text{-}B— \quad (III)$$

- wherein $R1=R2=R3=R4=CH_3$ and $A=B=C_6H_{12}$,
- said polymer being in a quantity of between 2% and 7% by mass with respect to the total mass of the aqueous solution,
  - ethylene glycol dimethacrylate in a quantity of between 8% and 12% by mass with respect to the total mass of the aqueous solution,
  - trimethylolpropane ethoxylate triacrylate the molar mass of which is 428 $g\cdot mol^{-1}$, in a quantity of between 2% and 13% by mass with respect to the total mass of the aqueous solution, and
- 2 hydroxy-4'-(2-hydroxyethoxy) 2 methylpropiophenone in a quantity between 2% and 3% with respect to the total mass of the aqueous solution.

13. An object having a surface on which bacteriostatic or bactericidal properties have been conferred in accordance with a method as defined in claim 1.

14. The object according to claim 13, wherein said object is selected from the group consisting of a film, a packaging film, a box, a tray, a case, a lid, a sachet, dialysis equipment, a rod, a probe, paper, a textile, a membrane and a filter.

15. A use of an object according to claim 13, for preparing garments and protective coatings, for packaging and/or storing food products such as fresh food products, or for purifying and/or decontaminating a solution, an object or a surface in the environmental or hospital field.

16. The method according to claim 5, wherein the poly (ethylene glycol) diacrylate has a molar mass of 700 $g \cdot mol^{-1}$.

17. The method according to claim 6, wherein said organic compound with three radically polymerisable functions is trimethylolpropane triacrylate selected from the group consisting of a trimethylolpropane ethoxylate triacrylate having a molar mass of 428 $g \cdot mol^{-1}$, a trimethylolpropane ethoxylate triacrylate having a molar mass of 692 $g \cdot mol^{-1}$, or a trimethylolpropane ethoxylate triacrylate having a molar mass of 912 $g \cdot mol^{-1}$.

* * * * *